United States Patent
Toebes et al.

(10) Patent No.: US 8,380,562 B2
(45) Date of Patent: Feb. 19, 2013

(54) ADVERTISEMENT CAMPAIGN SYSTEM USING SOCIALLY COLLABORATIVE FILTERING

(75) Inventors: John Toebes, Cary, NC (US); Brian Patrick Lawler, San Francisco, CA (US); Gary T. Chou, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 952 days.

(21) Appl. No.: 12/109,549

(22) Filed: Apr. 25, 2008

(65) Prior Publication Data

US 2009/0271256 A1    Oct. 29, 2009

(51) Int. Cl.
G06Q 40/00    (2012.01)
(52) U.S. Cl. .......................................... 705/14
(58) Field of Classification Search .................. 705/14
See application file for complete search history.

(56) References Cited

U.S. PATENT DOCUMENTS

| | | | | |
|---|---|---|---|---|
| 5,918,014 | A * | 6/1999 | Robinson | 709/219 |
| 6,064,980 | A | 5/2000 | Jacobi et al. | |
| 6,088,722 | A * | 7/2000 | Herz et al. | 709/217 |
| 6,681,247 | B1 | 1/2004 | Payton | |
| 6,697,800 | B1 | 2/2004 | Jannink et al. | |
| 7,092,926 | B2 * | 8/2006 | Cerrato | 706/48 |
| 7,343,365 | B2 | 3/2008 | Farnham et al. | |
| 7,444,658 | B1 * | 10/2008 | Matz et al. | 725/34 |
| 7,672,937 | B2 * | 3/2010 | Madhavan et al. | 707/752 |
| 2002/0029267 | A1 * | 3/2002 | Sankuratripati et al. | 709/224 |
| 2002/0065802 | A1 | 5/2002 | Uchiyama | |
| 2002/0178257 | A1 | 11/2002 | Cerrato | |
| 2003/0105681 | A1 | 6/2003 | Oddo | |
| 2003/0106057 | A1 | 6/2003 | Perdon | |
| 2004/0025174 | A1 | 2/2004 | Cerrato | |
| 2004/0267388 | A1 | 12/2004 | Perdon | |
| 2005/0204276 | A1 | 9/2005 | Hosea et al. | |

(Continued)

FOREIGN PATENT DOCUMENTS

| | | |
|---|---|---|
| WO | WO 01/15052 A1 | 3/2001 |
| WO | WO 03/053039 A2 | 6/2003 |

(Continued)

OTHER PUBLICATIONS

Takahashi et al.: The active lurker: Influence of an in-house online community on its outside environment, GROUP'03, Nov. 2003, Florida, pp. 1-10.*

(Continued)

Primary Examiner — Bijendra K Shrestha
(74) Attorney, Agent, or Firm — Leon R. Turkevich

(57) ABSTRACT

In one embodiment, a method comprises identifying, in a network, user selection preferences of an identified user having accessed the network, the identifying based on an accumulation of user selection inputs executed by the identified user, the user selection inputs accumulated relative to input options presented to the user and identifying respective available network items; classifying, by an apparatus in the network, the identified user into one of multiple user affinity categories relative to an advertisement campaign for a targeted product, the classifying based on determining whether one of the user selection inputs represents a view gesture of the user having viewed the targeted product; and selecting an advertisement asset for delivery to the identified user based on the classifying of the identified user into the one user affinity category.

26 Claims, 17 Drawing Sheets

U.S. PATENT DOCUMENTS

| | | | |
|---|---|---|---|
| 2005/0289582 A1* | 12/2005 | Tavares et al. | 725/10 |
| 2007/0005437 A1 | 1/2007 | Stoppelman | |
| 2007/0061195 A1 | 3/2007 | Liu et al. | |
| 2007/0094208 A1 | 4/2007 | Cerrato | |
| 2007/0124296 A1 | 5/2007 | Toebes | |
| 2007/0239554 A1 | 10/2007 | Lin et al. | |
| 2007/0244750 A1 | 10/2007 | Grannan et al. | |
| 2007/0266048 A1* | 11/2007 | Prosser et al. | 707/104.1 |
| 2008/0235078 A1* | 9/2008 | Hong et al. | 705/10 |

FOREIGN PATENT DOCUMENTS

| | | | |
|---|---|---|---|
| WO | 2005055102 | | 6/2005 |
| WO | WO-2007/063162 | * | 11/2005 |
| WO | WO-2007/058723 | * | 10/2006 |
| WO | 2007058723 | | 5/2007 |
| WO | 2007063162 | | 6/2007 |
| WO | WO 2007/120956 A2 | | 10/2007 |
| WO | WO 2007/130681 A2 | | 11/2007 |

OTHER PUBLICATIONS

Nonnecke et al.: Lurker demographics: Counting the silent, Apr. 2000, CHI '2000, The hague, Amsterdam, pp. 73-80.*

Ridings et al.: Psychological barriers: Lurker and Poster motivation and behavior in online communities, Oct. 2006, Communications of the Associations for information systems, pp. 329-354.*

Nonnecke et al.: Lurker demographics : Counting the silent, Apr. 1-6, 2000, CHI 2000, The Hague, Amsterdam, CHI Letters, vol. 2, Issue 1, pp. 73-80.*

Ridings et al.: Psychological Barriers: Lurker and POster Motivation and Behavior in Online Communities, Communications of Association for Online Communities, 2006, vol. 18, pp. 329-354.*

Techcrunch.com, "Taboola Lands $1.5 Million, Powers Video Discovery" [online] (Nov. 17, 2007). [retrieved Jan. 28, 2008]. Retrieved from the Internet: <URL: http://www.techcrunch.com/2007/11/14/taboola-lands-15-million-powers-video-discovery/>, pp. 1-4.

Hirschorn, "The Digital-Music Mosh Pit", [online], The Atlantic.com (Jan. 2007) [retrieved Jan. 28, 2008]. Retrieved from the Internet: <URL: http://www.theatlantic.com/doc/200701/hirschorn-radio>, pp. 1-4.

"Digital Interactive Video Exploration & Reflection (DIVER)—What Makes Diver Different?", [online], Stanford University (Feb. 8, 2007) [retrieved Jan. 28, 2008]. Retrieved from the Internet: <URL: http://web.archive.org/web/20070208005336/diver.stanford.edu/different.html>, 1 page.

U.S. Appl. No. 11/812,452, filed Jun. 19, 2007, Kuhlke et al.

U.S. Appl. No. 11/860,115, filed Sep. 24, 2007, Pelton.

U.S. Appl. No. 11/947,298, filed Nov. 29, 2007, Toebes et al.

Senise, "Who Is Your Nest Customer?" [online], [retrieved Sep. 8, 2007]. Retrieved from the Internet: <URL: http://www.strategy-business.com/media/file/enews-09-28-07>, 4 pages.

Exeros DataMapper, "Accelerate Data Integration by Automating the Discovery of Source-to-Target Data Maps", Mar. 29, 2006 [online], [retrieved Jan. 28, 2008]. Retrieved from the Internet: <URL: http://web.archive.org/web/20060329012647/http://www.exeros.com/pdf/DataMapperDataSheet, 2 pages.

Fast AdMomentum, [online], [retrieved on Apr. 22, 2008]. Retrieved from the Internet: <URL: http://www.fastsearch.com/I3a.aspx?m=1028&amid=11545>, 1 page.

Five Across, "Connect 1.8 Community Builder Site Management", Jul. 2, 2007, [online], [retrieved on Jan. 29, 2008]. Retrieved from the Internet: <URL: http://web.archive.org/web/20070702052520/www.fiveacross.com/product/connectprovider.html>, pp. 1-2.

Five Across, "Connect 1.8 Community Builder", Jul. 1, 2007, [online], [retrieved on Jan. 29, 2008]. Retrieved from the Internet: <URL: http://web.archive.org/web/20070701114331/http://www.fiveacross.com/product/index.html>, 1 page.

Five Across, "Five Across Connect 1.8 Community Builder Data Sheet", Jul. 10, 2007, [online], [retrieved on Jan. 29, 2008]. Retrieved from the Internet: <URL:http://web.archive.org/web/20070710104211/http://www.fiveacross.com/product/Connect_1_8 datasheet_FINAL>, 1 page.

Five Across, "Connect 1.8 Community Builder Implementation", Jul. 1, 2007, [online], [retrieved on Jan. 29, 2008]. Retrieved from the Internet: <URL: http://web.archive.org/web/20070701223046/www.fiveacross.com/product/implementation.html>, 1 page.

Five Across, "Connect 1.8 Community Builder End User Features", Jul. 2, 2007, [online], [retrieved on Jan. 29, 2008]. Retrieved from the Internet: <URL:http://web.archive.org/web/20070702052827/www.fiveacross.com/product/connect end user.html>, pp. 1-2.

Revenue Science, "About Us", [online] [retrieved on Apr. 22, 2008] Retrieved from the Internet: <URL: http://www.revenuescience.com/about.asp>, 1 page.

Gonzales, "Taboola Lands $1.5 Million, Powers Video Discovery" Nov. 17, 2007 [online] [retrieved on Jan. 28, 2008] Retrieved from the Internet: <URL: http://www.techcrunch.com/2007/11/14/taboola-lands-15-million-powers-video-discovery/>, pp. 1-4.

"Tacoda—Where the People Are" [online] [retrieved Apr. 22, 2008] Retrieved from the Internet: <URL: http://www.tacoda.com, pp. 1-3.

Wunderloop, "Targeting Options" [online] [retrieved on Apr. 22, 2008] Retrieved from the Internet: <URL: http://wunderloop.com/en/?page_id=61>, 2 pages.

DIVER, "What Makes Diver Different?", (Jan. 12, 2007) [online], [retrieved Jan. 28, 2008]. Retrieved from the Internet: <URL: http://web.archive.org/web/20070112195110/http://diver.stanford.edu>, 1 page.

DIVER, (Feb. 8, 2007) [online], [retrieved Jan. 28, 2008]. Retrieved from the Internet: <URL: http://web.archive.org/web/20070208005206/diver.stanford.edu/what.html, 1 page.

DIVER, "Overview of DIVER system (panoramic capture)", (Feb. 8, 2007) [online], [retrieved Jan. 28, 2008]. Retrieved from the Internet: <URL: http://web.archive.org/web/20070208005317/diver.stanford.edu/overview.html>, 1 page.

DIVER, "Teacher Education", (Feb 8, 2007) [online], [retrieved Jan. 28, 2008]. Retrieved from the Internet: <URL: http://web.archive.org/web/20070208005357/diver.stanford.edu/teacherEd.html>, 1 page.

ChoiceStream RealRelevance, "Video Suite 2.0", [online], [retrieved Apr. 21, 2008]. Retrieved from the Internet: <URL: http://www.choicestream.com/pdf/ChoiceStream_RRVS_Brochure-TV_ed>, pp. 1-4.

Pandora, "About the Music Genome Project" [online] [retrieved on Oct. 11, 1007] Retrieved from the Internet: <URL:http://pandora.com/corporate.mgp>, 1 page.

Wikipedia, "Collaborative filtering" [online] [retrieved on Oct. 11, 2007] Retrieved from the Internet: <URL:http://en.wikipedia.org/w/index.php?title=Collaborative_filtering&printable=yes>, pp. 1-6.

Google, "Earn Money From Relevant Ads on Your Website", [online] [retrieved on Feb. 20, 2008] Retrieved from the Internet: <URL: https://www.google.com/adsense/login/en_US/?sourceid=aso&subid=w...>, pp. 1-2.

My Best Segments, "Consumer Segments, Defined and Described Detailed Customer Segmentation Profiling", Jun. 16, 2007, [online], [retrieved on Jan. 28, 2008]. Retrieved from the Internet: <URL: http://web.archive.org/web/20070616140103/http://www.claritas.com/MyBestSegments/Default.jsp>, pp. 1-2.

Wikipedia, "Psychographic", [online], [retrieved on Apr. 22, 2008]. Retrieved from the Internet: <URL: http://en.wikipedia.org/w/index.php?title=Psychographic&printable=yes>, 1 page.

The Atlantic.com, "The Digital-Music Mosh Pit", Jan. 2007, [online], retrieved on Retrieved from the Internet: <URL: http://www.theatlantic.com/doc/200701/hirschorn-radio>, pp. 1-4.

Pandora Radio, "Listen to Free Internet Radio, Find New Music", [online], [retrieved on Oct. 11, 2007]. Retrieved from the Internet: <URL: http://pandora.com>, 1 page.

Toebes, "Enabling a Richer Video Experience With Metadata", W3C Video on the Web Workshop, Dec. 12-13, 2007, San Jose, California and Brussels, Belgium [online], [retrieved on Apr. 9, 2008]. Retrieved from the Internet: <URL: http://www.w3.org/2007/08/video/positions/Cisco_MSG.html>, pp. 1-4.

* cited by examiner

User Selection Preferences, 34

| Likes (Selections Having Positive Affinity) | Ignored | Dislikes (Negative Affinity) (Based on Ratings or Comments) |
|---|---|---|
| Photography/ Cameras: Canon EOS Lenses: Canon, Tamron | Nikon Sigma | Olympus, Pentax Tokina |
| History/ TV, Video: History Channel/ The Roman Empire ← 108 DVD: Bill Clinton: Hope, Charisma, Controversy Film: Syriana Books: Clinton, "My Life" (Autobiography) | Bible Battles World War 2 Stories Primary Colors | Books: Author=Ann Coulter |
| Drama/ TV: "Lost", "West Wing" ← 66a | CSI: Crime Scene Investigation ← 68 | "24" ← 66b |

| User Index | Item Affinity Value | Item ID |
|---|---|---|
| P1 | 375 } | I383 |
|  | 286 } 54a | I1 |
|  | 137 } | I221 |
|  | 122 } | I323 |
|  | ... | ... |
|  | 2 } | I159 |
|  | 0 } 54b | I722 |
|  | 0 } | I23 |
|  | ... | ... |
|  | 0 } | I21 |
|  | -4 } | I676 |
|  | -46 } 54c | I993 |
|  | -80 } | I65 |

Figure 6

| Item Index | User Affinity Value | User ID |
|---|---|---|
| I1 | 301 | P362 |
|  | 297 | P259 |
|  | 287 | P35 |
|  | 286 | P1 |
|  | 264 | P377 |

ADVERTISEMENT CAMPAIGN SYSTEM USING SOCIALLY COLLABORATIVE FILTERING

CROSS REFERENCE TO RELATED APPLICATIONS

This application is related to commonly-assigned U.S. patent application Ser. No. 11/947,298, filed Nov. 29, 2007 and entitled "Socially Collaborative Filtering".

TECHNICAL FIELD

The present disclosure generally relates to computer-based advertisement campaign systems that create, distribute, and report advertisement campaigns. The present disclosure also generally relates to devices that perform filter-based searching of data available via information networks such as a wide area network (for example, the World Wide Web or the Internet), for example collaborative filtering.

BACKGROUND

The exponential growth of information available to users of various information networks (for example, broadcast, satellite, or cable television; wide area networks such as the World Wide Web or the Internet), requires organizing the presentation of the available information in an efficient and effective manner. Collaborative filtering attempts to organize presentation of information to a user in a wide area network (for example, the World Wide Web) based on automatically predicting the interests of a user by establishing relationships between items of interest to the user (for example, items recently viewed by the user at a commercial website) and other items that have been determined as of interest to other users. Item-based collaborative filtering, illustrated for example at the website "amazon.com" (users who bought x also bought y) is based on the premise that if a number of users purchase both items "x" and "y", then another user viewing (or purchasing) the item "x" also may be interested in the item "y".

Other examples of filtering content include human directed programming (for example, conventional network television programming), demographic based targeting that classifies individuals according to demographics, content based targeting (for example, Google AdSense available on the World Wide Web at the website address "google.com/adsense"), user defined filters (for example, a TiVo® WishList search on a commercially-available TiVo® Digital Video Recorder), popularity based targeting, domain-specific knowledge recommendation systems (for example, available at the website address "pandora.com") and ratings-based filtering (for example, a ratings system provided by the online service "Netflix" at the website "netflix.com").

Advertisers can implement an advertisement campaign for a targeted product or service based on distributing advertisement assets from the advertisement campaign (for example, text string, image banner, audio or video stream, etc.) to target audiences via various media markets. The advertisement campaign for the targeted product (referred to as an "ad buy") is assigned a rule for supplying one of the advertisement assets of the advertisement campaign in response to an advertisement request relative to a target audience attribute: the target audience attribute can be implemented in various forms, depending on the medium used to convey the advertisement, for example keyword (for example, Google AdSense at the website address "www.google.com/adsense"), Uniform Resource Locator (URL), or a target demographic. Hence, a user browser accessing a web page can cause Javascript resource executed in the user browser to send a request to an advertisement server, causing the advertisement server to execute the rule for the advertisement campaign in order to supply to the Javascript resource an advertisement asset relative to the target audience attribute (for example, keyword in the web page, URL of the web page).

One example of targeted advertising involves use of psychographic analysis for market segmentation and advertising. Psychographic analysis involves establishing a psychographic profile of a defined class of consumers to predict subsequent behaviors by members of the defined class. The psychographic profile can include attributes relating to personality, values, attitudes, interests, or lifestyles of the defined class.

BRIEF DESCRIPTION OF THE DRAWINGS

Reference is made to the attached drawings, wherein elements having the same reference numeral designations represent like elements throughout and wherein:

FIG. 5 illustrates example user selection preferences for an identified user accumulated based on the input options presented to the user, the user selection inputs executed by the identified user, and input options not having been selected by the identified user, according to an example embodiment.

FIG. 6 illustrates example item affinity values for a given user based on the corresponding user selection preferences, according to an example embodiment.

FIG. 7 illustrates example user affinity values provided by network users for a given network item, according to an example embodiment.

DESCRIPTION OF EXAMPLE EMBODIMENTS OVERVIEW

Figure 1:
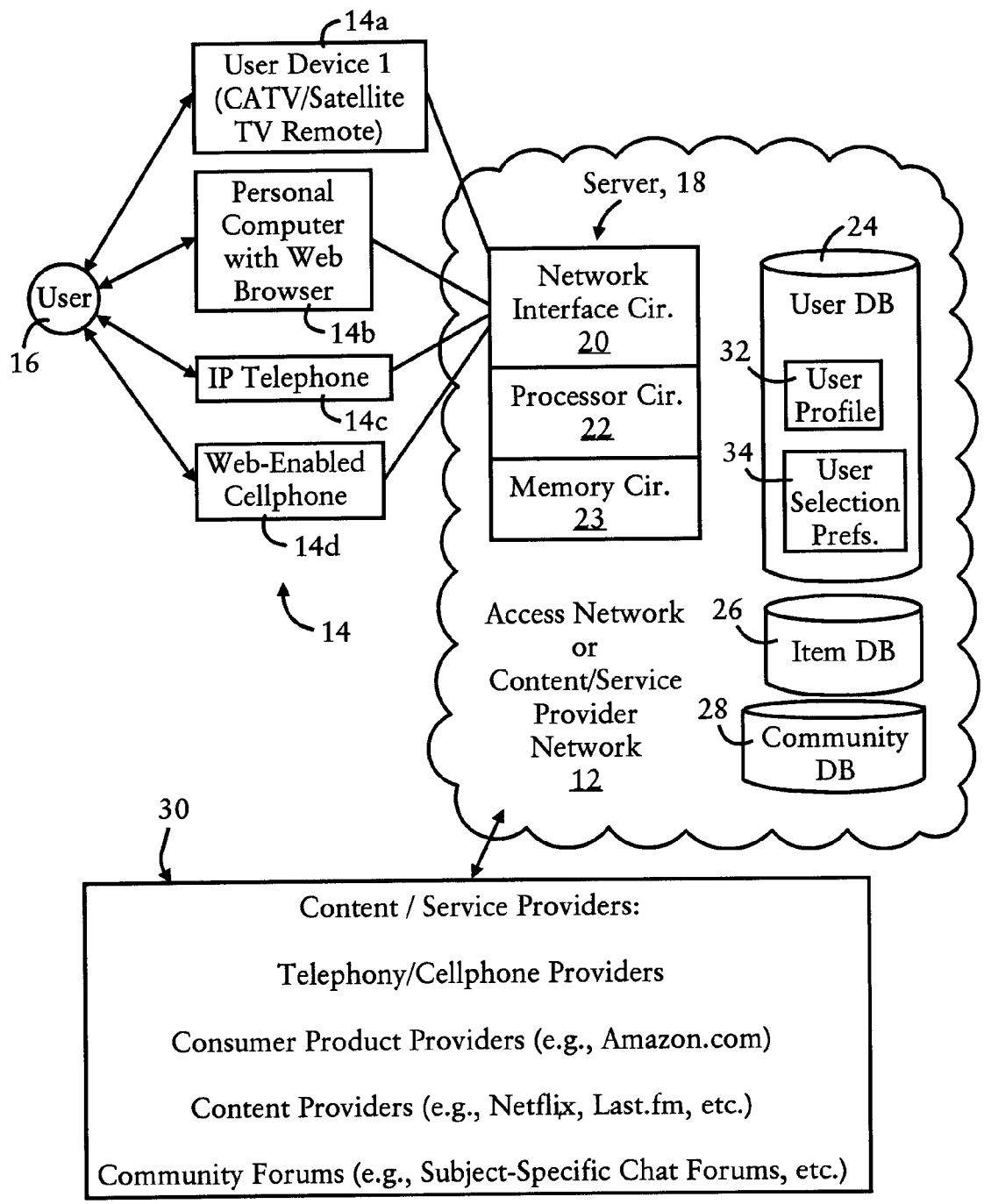
FIG. 1 illustrates an example system for executing socially collaborative filtering for generation of recommendations personalized to a user's tastes, according to an example embodiment.

In one embodiment, a method comprises identifying, in a network, user selection preferences of an identified user having accessed the network, the identifying based on an accumulation of user selection inputs executed by the identified user, the user selection inputs accumulated relative to input options presented to the user and identifying respective available network items; classifying, by an apparatus in the network, the identified user into one of multiple user affinity categories relative to an advertisement campaign for a targeted product, the classifying based on determining whether one of the user selection inputs represents a view gesture of the user having viewed the targeted product; and the apparatus selecting an advertisement asset for delivery to the identified user based on the classifying of the identified user into the one user affinity category, the advertisement asset selected from among multiple advertisement assets associated with the respective user affinity categories for the advertisement campaign.

In another embodiment, an apparatus comprises a network interface circuit and a processor circuit. The network interface circuit is configured for determining an identified user is accessing a network, and in response outputting, via the network for presentation to the identified user, an advertisement asset for delivery to the identified user. The processor circuit is configured for identifying user selection preferences of the identified user based on an accumulation of user selection inputs executed by the identified user, the user selection inputs accumulated relative to input options presented to the user and identifying respective available network items. The processor circuit also is configured for classifying the identified user into one of multiple user affinity categories relative to an advertisement campaign for a targeted product, the classifying based on the processor circuit determining whether one of the user selection inputs represents a view gesture of the user having viewed the targeted product. The processor circuit also is configured for selecting the advertisement asset for delivery to the identified user based on the classifying of the identified user into the one user affinity category, the advertisement asset selected from among multiple advertisement assets associated with the respective user affinity categories for the advertisement campaign.

DETAILED DESCRIPTION

Particular embodiments apply the system of socially collaborative filtering described in commonly-assigned U.S. patent application Ser. No. 11/947,298, filed Nov. 29, 2007 and entitled "Socially Collaborative Filtering", for selecting an advertisement asset that is considered most appropriate for a user based on classifying the user into a user affinity category relative to a target product.

The commonly-assigned U.S. patent application Ser. No. 11/947,298 describes a system (for example, a service provider, a media content provider, an electronic commerce website) that can provide personalized recommendations to a user of the system based on tracking user activities in order to identify user selection preferences. Any and all network-based activities by a user can be identified relative to the context presented to the user, namely the input options presented to the user. The user selection preferences can be identified based on accumulating the identified network-based activities relative to the context presented to the user, including not only accumulating the user selection inputs executed by the identified user, but also identifying and accumulating the input options that were presented (i.e., offered) to the user but ignored by the user. Consequently, the user selection inputs can be more precisely evaluated when compared in context with the other input options that were presented to the user (for example, at the same time as the input option selected by the user), but that were ignored by the identified user based on detecting the respective input options were not selected by the user.

As described in the commonly-assigned U.S. patent application Ser. No. 11/947,298, the accumulation of user selection inputs by the user, relative to the context of the input options presented to the user but ignored by the user, demonstrate "socially relevant gestures" that can be used by the system to identify the user selection preferences. Socially relevant gestures can include: identifying the user for example based on user login or detecting a unique identification token (for example, an RFID tag, a digital signature, a cookie, etc.); identifying a physical or network location of the user (for example, based on presence information or locality information provided either explicitly or inherently by a user device utilized by the user to access the network); identifying content that the user has chosen historically with respect to viewed content (for example, tracking what television shows, movies, etc. a user has viewed and for how long, or identifying a location within presented content where a user changes his or her interest to other content or browsed content); identifying content or items that the user has commented on, for example within online forms or communities; identifying network access activities by the user, for example types of user devices used to access network items, duration of access, whether multiple access devices are concurrently utilized, etc.

The identification of the user selection preferences for a given user (based on having detected the socially relevant gestures of the user) can be used with network information maintained within the system in order to dynamically generate recommendations for the user that are based on a collaborative filtering of the user selection preferences with the network information. Hence, applying collaborative filtering to the user selection preferences in combination with the network information results in a socially collaborative filtering of content that is personalized precisely for the user.

As described in further detail below, the socially collaborative filtering described in commonly-assigned U.S. patent application Ser. No. 11/947,298 can be applied to creation and/or implementation of an advertisement campaign, where the content that is personalized precisely for the user can include an advertisement asset from an advertisement campaign for a targeted product, where the advertisement asset is selected based on classifying the identified user into one of multiple user affinity categories relative to the advertisement campaign. For example, socially relevant gestures for the identified user can be analyzed to determine the relative affinity of the identified user toward the targeted product, even if the identified user has never viewed the targeted product or is unaware of the targeted product. The socially relevant gestures of the identified user can be used to classify the identified user into one of multiple user affinity categories relative to the advertisement campaign for the targeted product, enabling the most appropriate advertisement asset for the advertisement campaign to be supplied to the user based on his or her user affinity category.

The socially collaborative filtering also can be applied to select the most appropriate advertisement campaign for the identified user, relative to the context of information being presented to the user. In addition, the socially collaborative filtering can be applied for creation of an advertisement campaign relative to an ideal user (for example, an "ad buy" against an ideal user), relative to a demographic (for example, an "ad buy" against a target demographic), relative to the target item itself (for example, an "ad buy" against a target item), etc.

A description will first be provided of socially collaborative filtering in accordance with the description in commonly-assigned U.S. patent application Ser. No. 11/947,298, followed by a description of implementing an advertisement campaign using socially collaborative filtering.

Socially Collaborative Filtering

Socially collaborative filtering executed by the example embodiments can enable different users to enjoy uniquely personal experiences, even when the different users access the very same content (for example, an e-commerce website or a video or DVD website such as "Netflix") for the first time.

The socially collaborative filtering executed by the example embodiments provides personalized and context-sensitive recommendations that can be updated in response to each detected socially relevant gesture by a user. The example embodiments can update the user selection preferences for a given user in response to each successive user selection input, including the corresponding context, and in response successively generate corresponding updated recommendations for the user. For example, in response to the system detecting that a user turns on his or her television set every weekday morning, the socially collaborative filtering executed by the example embodiments can determine from the user's socially relevant gestures that the user would most likely prefer a specific news channel, and in response present the user with his or her favorite TV news channel (for example, CNN as opposed to Fox News or local news). Detecting a request for a channel change can cause the example embodiments to provide the next favorite content based on the user selection preferences relying on the socially relevant gestures, for example sports news that is custom tailored for a specific sports category or team, and which does not provide any news related to certain sports teams disliked by the user Hence, the updating of the user selection preferences in response to each socially relevant gesture by a user can be used to increase an affinity for the network item being presented (i.e., offered) to the user, in other words strengthening the relationship between the user and the network item being presented to the user. The updating of the user selection preferences also can be used to decrease an affinity for network items being presented to the user in order to decrease the strength of the corresponding relationship, for example in the case of network items that are ignored by the user, or detection of socially relevant gestures demonstrating that the user exhibits a dislike for certain network items.

As described in further detail below, use of the term "network item" in this specification refers to online content that can be consumed by a user either directly via the network (for example, online videos, music, e-books, online articles, written commentary, etc.) or indirectly via the network (for example, downloading online content to local storage for future consumption), and network objects that explicitly represent tangible goods (or a collection thereof) that can be obtained by the user using the network for consumption thereof (for example, ordering DVD videos via "Netflix.com" or "Amazon.com", tangible goods such as books, videos, etc., via "Amazon.com", etc.). Hence, the term "network item" does not include ratings (for example, a star-based rating), etc. that may be associated with online content or network objects representing tangible goods; rather, such ratings are used to identify socially relevant gestures relative to identified network items.

FIG. 1 illustrates an example system for executing socially collaborative filtering for generation of recommendations personalized to a user's tastes, according to an example embodiment. The system 10 includes a network 12 configured for detecting user selection inputs from user devices 14 under the control of an identifiable user 16. Example user devices 14 can include a remote control 14a for an intelligent digital television system, a personal computer 14b having a web browser, an IP based telephone 14c (for example, a voice over IP telephone), and/or a web enabled cell phone 14d that can be configured for wireless voice over IP communications. The IP telephone 14c and the web-enabled cell phone 14d also can include a web browser.

Each of the user devices 14 can be configured for sending the user selection inputs to the network 12, either directly or via intermediate devices (for example, cable or satellite television set-top box configured for sending requests to the network 12; local access router at the customer premises, etc.) to a server 18 configured for responding to the user selection inputs by supplying recommended content back to the requesting user device 14.

As described in further detail below, the server 18 includes a network interface circuit 20 and a processor circuit 22. The network interface circuit 20 can be configured for receiving or detecting the user selection inputs from the user devices 14; the network interface circuit 20 also can be configured for accessing databases 24, 26, and/or 28, described below; network interface circuit 20 also can be configured for outputting personalized recommendations to the user devices 14, where the personalized recommendations can include at least one new network item determined most likely to be preferred by the identified user 16 based on socially collaborative filtering executed by the processor circuit 22. The new network item supplied to the user device can be implemented either as a reference (for example, a Uniform Resource Identifier (URI)) to the recommended content available from identifiable providers 30, or in the form of the actual content to be presented for consumption by the user 16 (i.e., consumed by the user) based on the server 18 retrieving the recommended content from the content or service providers 30. The personalized recommendations also can identify at least one network item already stored locally on a user device (e.g., a personal computer 14b) and that is indexed within the network 12, for example within any one of the databases 24, 26, or 28.

The example server 18 can be implemented as a single server that can be implemented at the head end of an access network 12 for a content provider offering content services to the user 16, the access network 12 providing access to other content or service providers 30 via a wide area network such as the Internet; alternately, the example server 18 can be implemented as a distributed server system within the network 12, where a first server within the distributed server system receives the user inputs and updates the user selection preferences, described below, and a second server within the distributed server system determines and outputs personalized recommendations for the user 16 based on the updated user selection preferences; alternately, the first server can interact with the user by detecting user inputs and supplying recommendations of network items to the user, and a second (back-end) server can generate the recommendations of the network items to be presented to the user, where either the first server or the second server can determine the socially relevant gestures from the user inputs. The example server 18 also can be implemented as part of a content provider network 30 that provides various services to the user 16 via a wide area network such as the Internet.

The example server 18 will be described herein within the context of a single, integrated server to simplify the description of the example embodiments. The operations described with respect to the server 18 also can be implemented in various forms, including a distributed server system implemented within an access network locally reachable by the user devices 14, or a distributed server system implemented within a content provider network that is remotely reachable by the user devices via a wide area network.

The server 18 can generate personalized recommendations for the user 16 based on executing socially collaborative filtering based on retrieval of information that can be stored in a user database 24, an item database 26, and/or a community database 28. The user database 24 can be configured for storing information related to the user 16, including a user profile 32 and user selection preferences 34. The user profile 32 can include information about the user 16, including personal account subscription information related to establishment and maintenance of any network service utilized by the network devices 14; the user profile 32 also can include identification of other network users that have a close relationship with the identified user 16 (i.e., user-to-user relationships), for example "buddy lists" for instant messaging sessions or cell phone subscriptions, or users of online forums that the user 16 has identified as being "favorite" users or "disliked" users. The user selection preferences 34, described in further detail below with respect to FIG. 5, can illustrate the socially relevant gestures of the identified user 16 based on an accumulation of the user selection inputs executed by the identified user 16 relative to the context of those user selection inputs (i.e., relative to other input options that were concurrently presented to the user with the input option that was selected by the user). As described below, the socially relevant gestures for the identified user 16 can be used to establish various relationships, for example user-item relationships that identify the network items for which the identified user 16 demonstrates having the highest affinity (i.e., preference).

The item database 26 can be configured for storing information about network items that are available for presentation to the user, including item-to-item relationships and item-to-user relationships, described below. The community database 28 can include information identifying relationships between the identified user 16 and other elements of a community-based network service, for example messaging boards, Internet-based recommendation sites, Internet-based social community websites, etc., where the identified user 16 can identify himself or herself as having particular preferences in terms of political interests, hobbies, "favorite" users, "disliked" users, preferred content, or content to avoid. The community database 28 is not strictly necessary for implementation of the example embodiments, but can add to generation of additional socially relevant gestures.

Figure 2:
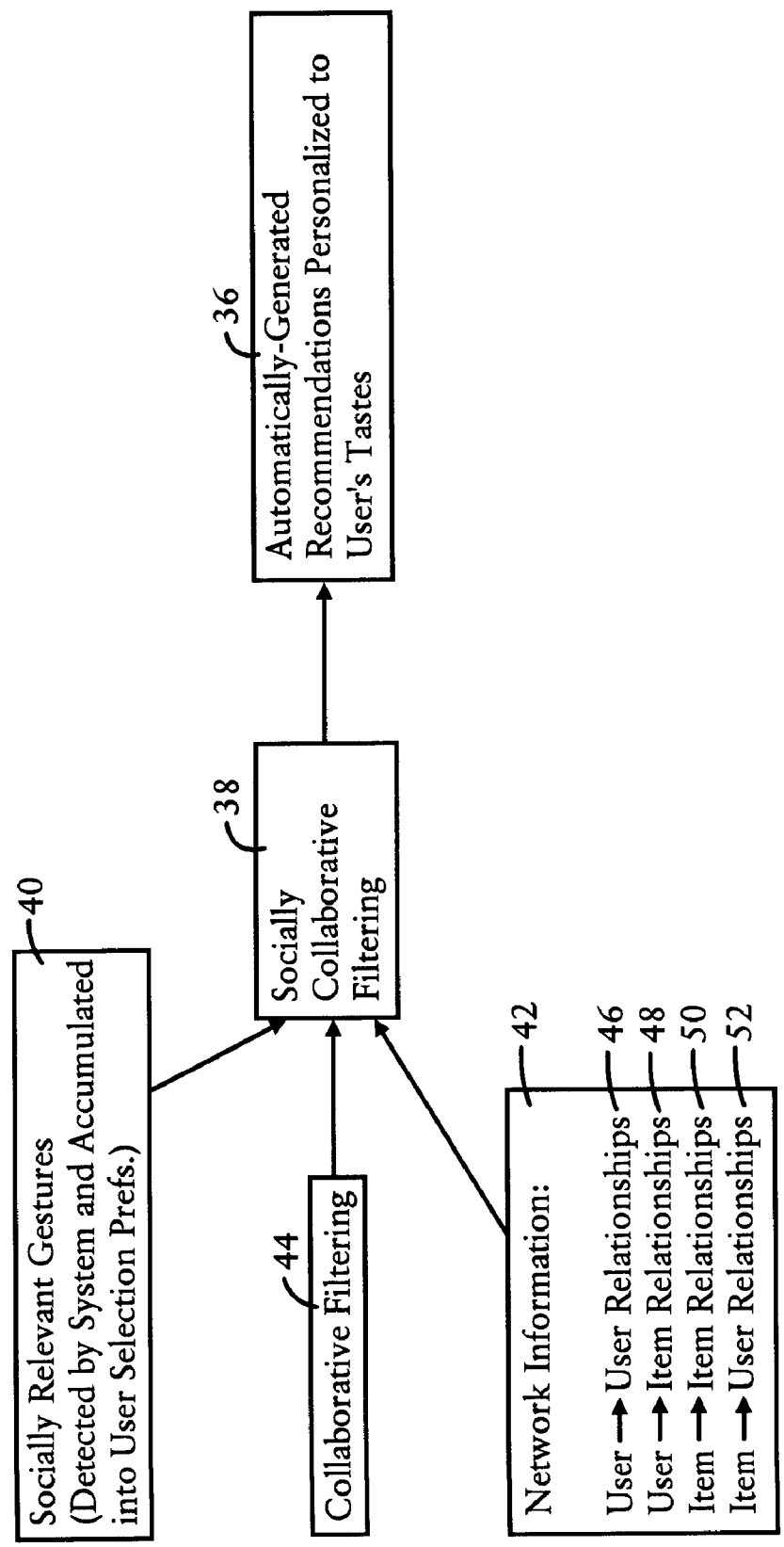
FIG. 2 illustrates an example execution of socially collaborative filtering for generation of the recommendations personalized to a user's tastes, according to an example embodiment.

FIG. 2 illustrates a summary example execution of socially collaborative filtering by the processor circuit of FIG. 1, according to an example embodiment. As described below, the processor circuit 22 can access any one of the databases 24, 26, and/or 28 in order to determine a list 36 of recommendations of network items that would most be preferred by the identified user 16 based on execution of socially collaborative filtering 38 by the processor circuit 22. The list 36 of recommendations of network items can include, for example, network items previously presented to the network user, and/or new network items that have not yet been presented to the user. In particular, the processor circuit 22 can execute socially collaborative filtering 38 based on applying the socially relevant gestures 40 exhibited by the user selection preferences 34 to available network information 42 using collaborative filtering techniques 44.

The network information 42 can include one-way relationships that demonstrate affinities of a given network object toward another network object. For example, the network information 42 can include one-way user-user relationships 46, one-way user-item relationships 48, one-way item-item relationships 50, and one-way item-user relationships 52. As described below, the processor circuit 22 can determine each of the relationships 46, 48, 50 and 52 based on socially relevant gestures 40, and store the relationships 46, 48, 50 and 52 in an appropriate database 24, 26, or 28 for future use, for example updating the relationships 46, 48, 50, or 52 in response to additional detected socially relevant gestures.

The user-to-user relationships 46, which can be determined and stored by the processor circuit 22 in the user profile 32 and/or the community database 28, can demonstrate specific affinity determined by the processor circuit 22 between one person toward another person, where a given person (A) can have a strong affinity toward another person (B) based on a close personal or business relationship, whereas the second person (B) may demonstrate a lesser affinity toward the first person (A) for example in the case of a manager or popular individual (B) being admired by the other person (A). Hence, the users A and B can demonstrate asymmetric (i.e., unequal) affinity values toward each other. The user-to-user relationships 46 typically are updated only when the relevant user (for example, A) establishes or updates (for example, modifies or deletes) the relationship with the other user (B); hence, the user-to-user relationships 46 are not updated as a result of the user (A)'s interactions with network items.

The user-item relationships 48, stored for example by the processor circuit 22 in the user selection preferences 34 and illustrated below with respect to FIGS. 6 and 8, can demonstrate specific affinity values generated by the processor circuit 22 and that represent the available network items 58 presented to the user 16 for which the corresponding user 16 has expressed the greatest interest or affinity: the specific affinity values that demonstrate the relative affinity or "strength" of the user-item relationships 48 are illustrated in FIG. 6 as "item affinity values" 54.

The item-item relationships 50, which can be generated and stored by the processor circuit 22 in the item database 26, can demonstrate predetermined relationships between distinct network items, for example: relationships established between products and different accessories (for example, battery charger for a cellphone or other battery-operated device); relationships between similar video content based on the same actors, actresses, directors, etc.; music written and performed by the same performer, etc. The item-item relationships 50 also can demonstrate relationships determined by the processor circuit 22 based on analysis of network content and performing comparisons between network items. An example item-item relationship 50 can be expressed by an e-commerce website that presents a product "X" with a related product "Y" with the description that individuals who purchased "X" also purchased "Y". Example techniques for implementing item-item relationships 50 include domain specific knowledge: examples of implementing domain specific knowledge include the commercially available filtering offered by ChoiceStream (at the website address "choicestream.com"), which determines equivalents between movies, or ExpertSystems technology for determining similarity between concepts in text based content. Use of the item-item relationships 50 by the processor circuit 22 enables more efficient and faster determination of equivalence for new content (i.e., new network items) that are added to (i.e., made available to) the system 10. Such relationship analysis can be performed at any time, including when the network items are added to the system 10, when any user accesses the network items, or during background scans of content within the system 10.

Figure 9:
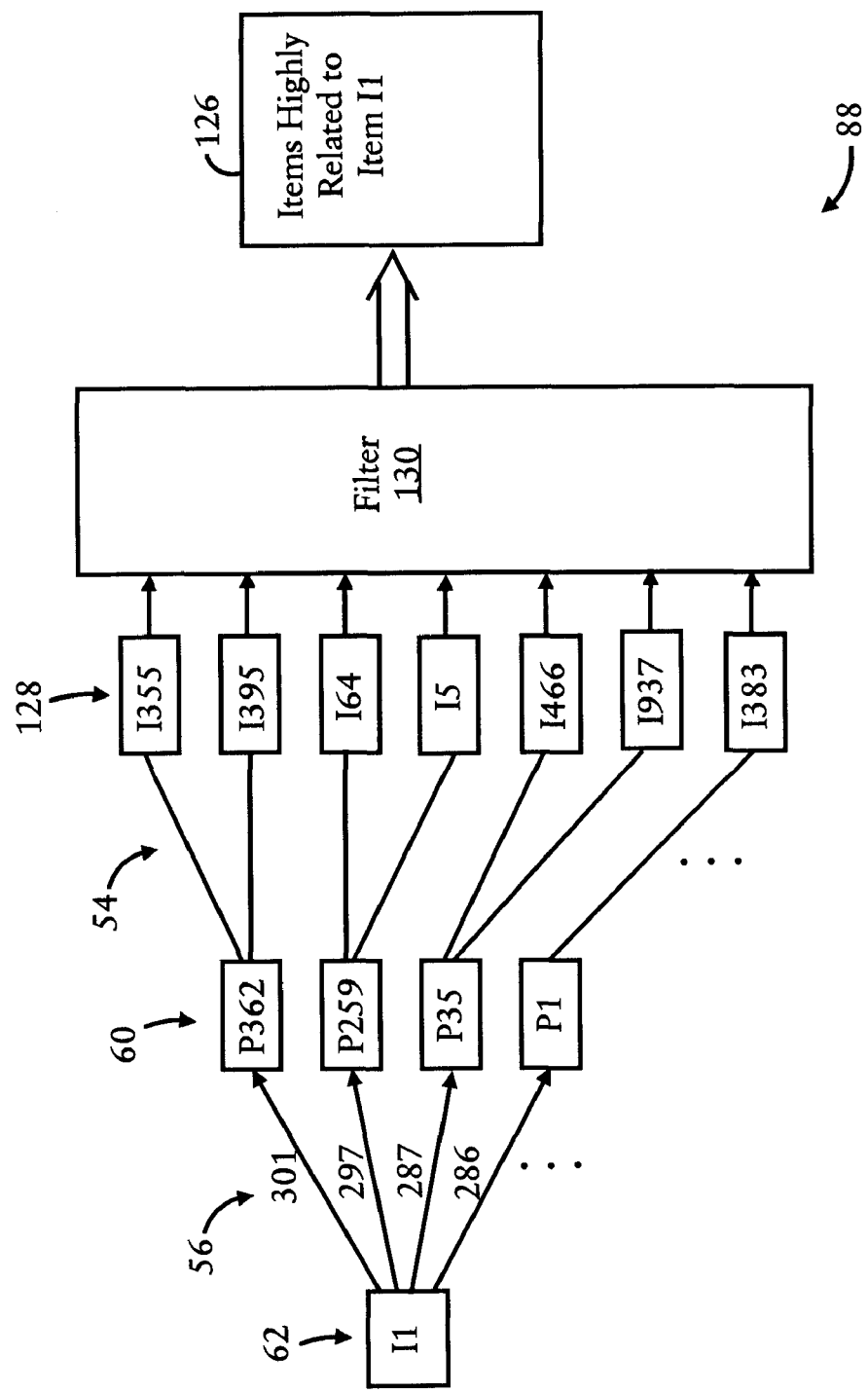
FIG. 9 illustrates an example determination of items highly related to a selected network item, according to an example embodiment.

The item-user relationships 52, which can be determined and stored by the processor circuit 22 in the item database 26, can demonstrate, for a given item, the relative affinity or "strength" of network users determined by the processor circuit 22 to a given item: the specific affinity values that demonstrate the "strength" of the item-user relationships 52 are illustrated in FIGS. 7 and 9 as "user affinity values" 56, where the network users having the strongest affinity toward a given item 62 (based on their corresponding item affinity value 54) are identified within the item-user relationships 52. Hence, each item-user relationship 52 has a corresponding "mirroring" (i.e., converse) user-item relationship 48. Use of distinct databases for the relationships 48 and 52 provide more efficient mapping, although it is foreseeable that a single database could be used to construct the relationships 48 and 52, regardless of the direction of the mapping.

Any of the disclosed circuits of the server 18 (including the network interface circuit 20, the processor circuit 22, and the memory circuit 23 and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (for example, within the memory circuit 23) causes the processor circuit to store application state variables in processor memory, creating an executable application resource (for example, an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 23 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (for example, in a transmit buffer). Any reference to "outputting a message" or "outputting a packet" (or the like) also can include electrically transmitting (for example, via wired electric current or wireless electric field, as appropriate) the message/packet stored in the tangible memory medium to another network node via a communications medium (for example, a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (for example, in a receive buffer). Also note that the memory circuit 23 can be implemented dynamically by the processor circuit 22, for example based on memory address assignment and partitioning executed by the processor circuit 22. In addition, the processor circuit 22 can be implemented as a multi-processor system or based on a distributed server system.

Figure 3:
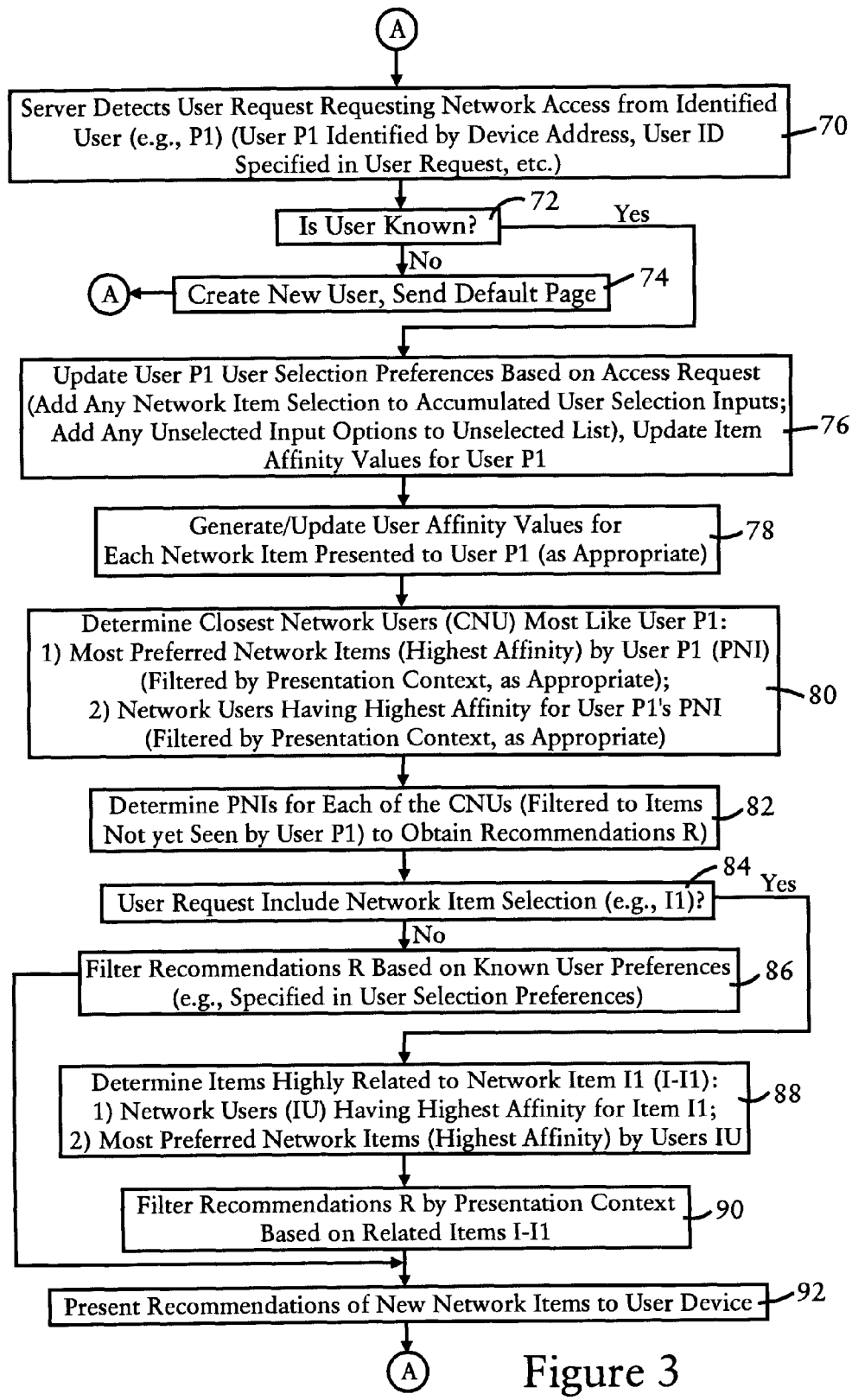
FIG. 3 illustrates an example method by the apparatus of FIG. 1 of generating the recommendations personalized to a user's tastes, according to an example embodiment.

FIG. 3 illustrates an example method by the server 18 of FIG. 1 of generating the recommendations 36 personalized to a user's tastes based on execution of socially collaborative filtering 38, according to an example embodiment. The steps described in FIG. 3, as well as the steps described below with respect to FIGS. 10, 11A-C, 12, 13, 14, and 15, can be implemented as executable code or encoded logic stored on a computer readable medium (for example, floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (for example, programmable logic arrays or devices, field programmable gate arrays, programmable array logic, application specific integrated circuits, etc.).

The network interface circuit 20 of the server 18 can detect in step 70 that the user ("P1") 16 is accessing the network 12, for example detecting a request from one of the user devices 14 addressed specifically to the network interface 20; alternatively, in a distributed server system the network interface circuit 20 can receive a request from another server (not shown) within the network 12 having received the user request. The user (for example, "P1") 16 can be identified by the server 18 or the other server (not shown) using different techniques, for example based on identifying a device address of the corresponding user device 14, a user identifier specified within the user request, an indicator identifying the physical or network presence of the user 16, etc. If in step 72 the user is not known, the processor circuit creates in step 74 a new user identifier entry, and sends to the new user a default introduction page to the access device 14 that includes a list of input options identifying respective available network items (for example, products and services such as movies, e-commerce shopping, Internet messaging forums, search operations, etc.).

Assuming in step 72 that the user is known as an identified user 16, the processor circuit 22 in the server 18 (or another server in a distributed server system) can update in step 76 the user selection preferences 34 in response to each input by the user 16 based on identifying the user selection input relative to the input options presented to the user identifying the respective available network items (i.e., the context of the corresponding user selection input), and any unselected input options indicating that the user 16 ignored these unselected input options. The identification of the user selection input relative to the context of input options presented to the user will be described in further detail with respect to FIGS. 4A and 4B.

Figure 4A:
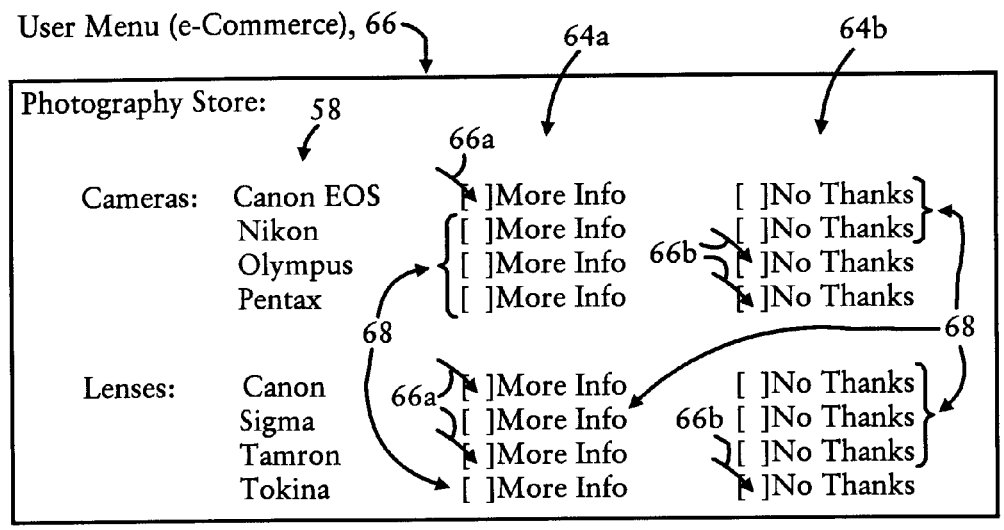
FIGS. 4A and 4B illustrate example input options presented to the user by the apparatus of FIG. 1, user selection input is executed by the user, and user input options that are not selected by the user.

FIG. 4A illustrates example input options 64 presented to the user 16 and identifying respective available network items (for example, identified content or tangible products). The input options 64 can be presented to the user 16, for example, in the form of one or multiple web pages that provide a user menu 66 of available products that can be purchased by the user 16. The user menu 66 illustrated in FIG. 4A illustrates multiple selections 66a and 66b that can be input over time by the user 16; hence, the user menu 66 illustrates an accumulation of multiple selections 66a and 66b that have been made by the user 16 for different network items 58. The processor circuit 22 can update in step 76 the user selection preferences 34, illustrated in FIG. 5, in response to each input 66a or 66b by the user 16, including positive user selection inputs 66a indicating the user 16 has a stronger affinity toward the corresponding selected input option 64, and/or negative user selection inputs 66b indicating the user 16 has a weaker affinity toward the corresponding selected input options 64. Hence, the user selection preferences 34 can be updated by the processor circuit 22 in step 76, for each detected user input 66a, to indicate the network items for which the user has expressed a favorable affinity ("Likes") 100; as apparent from the foregoing, multiple requests for the same or similar items can cause respective updating of the user selection preferences that can indicate a stronger affinity toward a given network item 58.

As illustrated in FIG. 4A, the processor circuit 22 also can determine the context of the corresponding user selection input 66a or 66b by also identifying input options 68 within the presentation 66 of available network items 58 that have not been selected by the user 16. Hence, the processor circuit 22 can identify the input options 68 that were not selected by the user 16, but rather were ignored by the user 16 who favored either a positive selection 64a or a negative selection 64b, by adding to the user selection preferences 34 an "ignore" category 104 identifying the input options 68 that were not selected by the identified user 16.

Figure 4B:
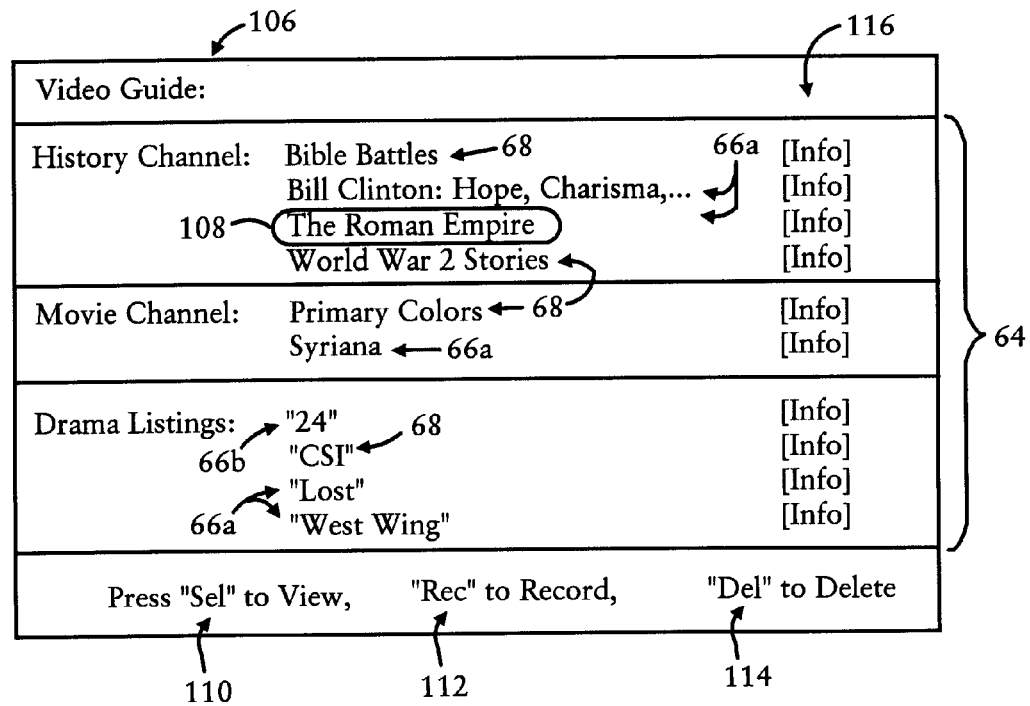

FIG. 4B illustrates additional input options 64 that can be presented to the user, for example in the form of a video guide 106. As illustrated in FIG. 4B, the user 16 can navigate the video guide 106 using the remote control 14a in order to highlight 108 a particular input option 64: in response to the user 16 pressing a selection key 110 to view the highlighted input option 108, the processor circuit 22 can update in step 76 the user selection preferences 34 to indicate that the user 16 has expressed a positive affinity 100 toward the highlighted input option (for example, the documentary "The Roman Empire") 108, along with an identification of other network items 64 that were ignored by the user 16. As apparent from FIGS. 4A, 4B, and 5, various network items may be moved from the ignored category 104 to either the favorable affinity category 100 or the unfavorable affinity category 102 based on subsequent input selections by the user 16, for example in response to detecting the user 16 pressing the record key 112 (indicating a positive affinity 100 based on the corresponding positive user selection input 66a), or the user 16 pressing the delete key 114 (indicating a negative affinity 102 corresponding to the negative user selection input 66b expressed by the delete key 114). The processor circuit 22 also can update the user selection preferences 34 based on the user 16 requesting additional information 116 about a given input option 64.

Hence, the user selection preferences 34 can be updated in step 76 of FIG. 3 in response to each corresponding user selection input (for example, 66a, 66b, 110, 112, 114): as described previously, the user selection preferences 34 can be updated by the processor circuit 22 in the same server 18 that receives the request in step 70, or by another server (not shown) in a distributed server environment. The updated user selection preferences 34 can be used by the processor circuit 22 in the server 18 (or another distributed server) to generate in step 76 item affinity values 54 for the user ("P1") 16, illustrated in FIG. 6. In particular, the processor circuit 22 can parse the user selection preferences 34 in order to quantify the relative "strength" of the user 16 toward a given network item (identified by its item identifier 58) in the form of an item affinity value 54, where a higher value indicates a stronger relationship by the user 16 toward the corresponding item 58, a zero value indicates no preference for the corresponding item 58 (for example, the item has been ignored), and a larger negative member indicates a stronger dislike by the user 16 toward the corresponding item 58.

The processor circuit 22 also can be configured to detect a user selection input toward a network item already stored locally in a user device (e.g., the personal computer 14b, a CATV/Satellite set-top box, etc.) and indexed within the network 12. Examples of a network item already stored locally in the user device 14 and indexed within the network 12 include a media file that was previously requested by the user 162, and/or or a media file that was automatically downloaded from the network 12 without a client request (for example, "pushed"), for example an electronic version of a "Book of the Month Club". Example user selection inputs toward the locally-stored network item can include viewing metadata related to the locally-stored network item (for example, within an online catalog or "guide" that identifies the locally-stored network item), consuming the locally-stored network item (for example, viewing or listening to the locally-stored network item), copying the locally-stored network item (for example, copying onto a portable player), sharing the locally-stored network item with another user, deleting the locally-stored network item, creating new network content (for example, comments), etc.

In response to the updating of the user selection preferences 34 in step 76 of FIG. 3 (either by the same server 18 or another server in a distributed server environment), the processor circuit 22 can generate and/or update in step 78 user affinity values 56 for each relevant network item 62 (illustrated in FIG. 7), for example each network item having a corresponding input option presented to the user. In particular, the processor circuit 22 can identify the user affinity values 56 for each network item 62 based on identifying the order of the highest item affinity values 54 (illustrated in FIG. 6) assigned by any of the network users 60, such that each user affinity value 56 of FIG. 7 identifies the corresponding affinity (for example, "301") by the corresponding network user (for example, "P362) 60 toward the corresponding network item (for example, "I1") 62. Hence, each user affinity value 56 is based on the corresponding user selection preference 34 for the corresponding user (for example, "P362").

The user affinity values 56 illustrated in FIG. 7 also can be updated in step 78 of FIG. 3 without necessarily relying on the user selection preferences 34, for example in response to a detected user selection input that does not necessarily represent a "request" for an available network item. In particular, a detected user selection input can represent a socially relevant gesture of a user's preference toward an available network item, for example in the form of a subjective rating by the user about an available network item.

The socially relevant gesture of a user supplying a user selection input demonstrating a preference (very favorable or very unfavorable) regarding an available network item is considered more important than the actual value of the preference. In particular, conventional collaborative filtering systems rely on actual ratings values assigned by the users in order to predict users' tastes. Such conventional approaches for identifying users who share the same rating patterns with the active user rely on identifying users having chosen the same rating values for the same network items; in other words, conventional collaborative filtering systems establish user-user relationships based on identifying users sharing the same rating values for the same network items. Consequently, if a user "A" inputs a five-star rating for a given item "X" and a user "B" also inputs a five-star rating for the same item "X", conventional collaborative filtering systems would establish a relationship between the users "A" and "B" based on both users entering the same rating value (five stars) for the same item "X". Such collaborative filtering techniques have been used to determine cohorts (i.e., a group of individuals having similar tastes). An example of fixed cohorts (using fixed demographic data) is illustrated for example by the Claritas Prizm Clustering by Claritas, Inc., San Diego, Calif.

In contrast, the disclosed embodiment does not store rating values, nor does the disclosed embodiment necessarily rely on the ratings values assigned by users. In fact, the inventors have discovered that actual ratings values have little value in determining recommendations (for example, due to subjective and inconsistent criteria that may be used even by the same user at different times). Rather, the inventors have discovered that a more effective and reliable indication of a user's interest (favorable or negative) in a given network item is the detection of the user having exerting the effort to rate the network item. In other words, the detected existence of a rating for an item is more important than the rating value in determining the user's interest.

Hence, the processor circuit can record the act of the user supplying a recommendation within a user selection input as a socially relevant gesture, based on updating in step 78 of FIG. 3 an item affinity value 54 for a corresponding network item 58 in response to detecting the user selection input. For example, a user selection input specifying "one-star rating" (representing a most negative rating) by a user can cause the processor circuit 22 to apply in step 78 of FIG. 3 a negative affinity weighting between the network user and the rated item (for example, reduce an existing item affinity value 54 by a prescribed amount of "−20"); in contrast, a user selection input specifying a "five-star rating" (representing the most positive rating) by the user can cause the processor circuit 22 to apply in step 78 of FIG. 3 a positive affinity weighting to the rated network item (for example, increase the existing item affinity value 54 by a prescribed amount of "+25"); a rating in between the "one-star rating" and the "five star rating" can cause the processor circuit 22 to apply in step 78 of FIG. 3 a nonzero affinity weighting in between the negative affinity value and the positive affinity value (for example, reduce the existing item affinity value 54 by a prescribed amount of "−2"). Hence, the detection of the most negative rating or the most positive rating by the user can cause the processor circuit 22 to detect the rating as a corresponding positive or negative socially relevant gesture having an identifiable affinity value.

The detection of an intermediate rating by the user in between the most negative rating and the most positive rating, however, is inherently unreliable in determining the user's interest; hence, the processor circuit 22 can detect the intermediate rating as a socially relevant gesture having a negligible affinity value indicating that the socially relevant gesture has minimal effect on determining the user interest. Hence, the processor circuit 22 can evaluate the value of the socially relevant gesture as a result of the rating input by the user, as opposed to the actual rating value input by the user, where a strong dislike or a strong like is more reliable and more meaningful than a moderate input. Once the rating operation is performed, the disclosed embodiment does not store the actual rating value, but rather records the socially relevant gesture of the user performing the rating operation within a certain context based on updating the corresponding item affinity value 54.

The recording of socially relevant gestures based on updating the corresponding item affinity value also enables the processor circuit 22 to accumulate multiple acts by the user of rating the same item at different instances. Hence, if a user supplies user inputs that assign the highest rating for a given network item on three separate instances (for example, over the course of a few days or weeks), the processor circuit 22 can increase the item affinity value 54 by that user toward the rated network item in response to each detected socially relevant gesture. Hence, each socially relevant gesture of assigning the highest rating to the network item causes a corresponding increase in the corresponding item affinity value 54, representing the user affinity toward the rated content. In contrast, conventional systems that rely on the value of the rating only will store the most recently entered rating value. Hence, the act of rating is considered significant as a socially relevant gesture, as opposed to the value of the rating.

Another example of accumulating multiple user selection inputs by the user, relative to ignored input options, can be a user selecting an input option after repeated instances of ignoring the input option during prior presentations. For example, if a user ignores an input option after five successive presentations, the corresponding item affinity value 54 can be reduced by a corresponding negative weighting based on the user ignoring the input option; however, if on the next successive presentation the user selects the previously-ignored input option, a much higher positive weighting can be added to the item affinity value 54 that outweighs the prior accumulated negative weightings, resulting in a net positive item affinity value 54.

Hence, the processor circuit 22 can identify a socially relevant gesture as increasing at least one item affinity value (also referred to as a positive socially relevant gesture) for example in response to a positive user selection input 66*a*, decreasing at least one item affinity value (also referred to as a negative socially relevant gesture) for example in response to a negative user selection input 66*b*, or generating little or no change in any item affinity value (also referred to as a neutral socially relevant gesture), described below.

A positive socially relevant gesture can be detected by the processor 22, for example, in response to a user 16 creating content, submitting positive comments on the content, providing a strong positive rating for the content (i.e., 5-star rating), or recommending the content to another user or to a group of users in an online community. Hence, example positive socially relevant gestures include a creation gesture that creates new network content, a comment gesture that inserts a comment into new or existing network content, a rate content gesture that provides a strong positive rating on the content, or a recommend content gesture that recommends the content to another user or group of users.

A neutral socially relevant gesture can be detected by the processor 22, for example, in response to a user 16 viewing the content, for example, for a brief interval indicating mild interest in the content (also referred to as a view gesture), or providing a neutral rating for the content, for example, 2-4 star rating out of a 1-5 star range (also referred to as a neutral rating gesture). Also note that the view gesture can be interpreted as either a positive socially relevant gesture, a neutral socially relevant gesture, or a negative socially relevant gesture, based on determining the duration of the viewing of the content as a percentage of the total duration of the content (for example, twenty percent or less is a negative socially relevant gesture, between twenty and seventy-five percent is a neutral socially relevant gesture, and above seventy-five percent is a positive socially relevant gesture).

A negative socially relevant gesture can be detected by the processor 22, for example, in response to a user 16 repeatedly ignoring content after multiple presentation offerings (also referred to as a multiple ignore gesture), submitting negative comments on the content or providing a strong negative rating, for example, a 1-star rating from the 5-star rating system (also referred to as a negative rating gesture), or abandoning viewing of the content (also referred to as an abandon view gesture).

Figure 8:
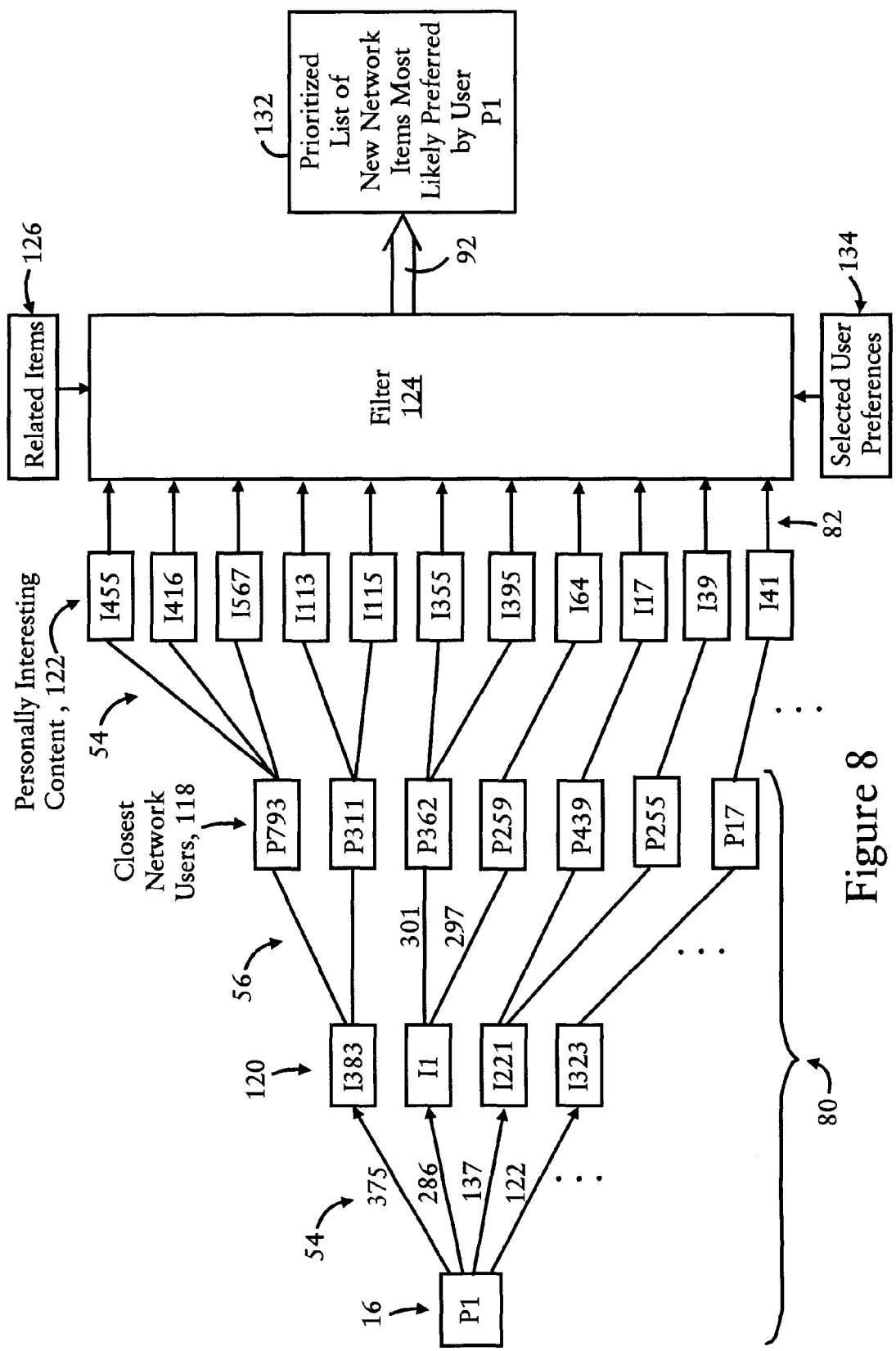
FIG. 8 illustrates an example determination of a prioritized list of network items most likely to be preferred by an identified user based on determining closest network users having the highest correlation a shared interests with the identified user, and identifying network items having the highest relative item affinity values among the similar network users, according to an example embodiment.

Referring back to FIG. 3, after updating of the user selection preferences 34, the user-item relationships 48 and/or the item-user relationships 52 (and storage in the appropriate databases illustrated in FIG. 1), the processor circuit 22 of the server 18 can continue execution of the socially collaborative filtering 38 by determining in step 80 the closest network users (CNU) 118, illustrated in FIG. 8, that have the highest correlation of shared interests with the identified user ("P1") 16, in response to the processor circuit 22 detecting that the user 16 is accessing the network. As described previously, the processor circuit 22 can detect that the identified user ("P1") 16 is accessing the network 12 based on the network interface circuit 20 receiving either the device request from a user device 14, or based on the network interface circuit 20 receiving an indication from another server in a distributed server system that a recommendation is needed in response to the user request.

FIG. 8 illustrates in further detail the operations of step 80 of FIG. 3. The processor circuit 22 can determine the group of closest network users (CNU) 118 (i.e., those network users 60 having the highest correlation of shared interests with the identified user "P1" 16) based on identifying, from the available network items 58 that have been presented to the user 16 based on the respective input options 64, the preferred network items (PNI) 120 having the highest relative item affinity values 54 generated for the identified user 16, as illustrated in FIG. 6 by the user-item relationships 48 indexed by the user "P1" 16. As described previously, the item affinity value 54 for a network item 58 is generated and updated (for example, by the processor circuit 22) in response to detecting socially relevant gestures associated with the network item (for example, multiple user selection inputs for viewing the item, purchasing the item, supplying a "5-star" rating), but does not include any rating value submitted by the user. Note that the preferred network items 120 can include all of the available network items 58 presented to the user, ordered based on the respective item affinity values 54, such that the highest affinity value item (for example "1383" in FIGS. 6 and 8) would be the first of the ordered list of preferred network items 120, and the lowest affinity value item (for example, "165" in FIG. 6) would be at the end of the ordered list of preferred network items 120.

Hence, the preferred network items 120 that have the highest relative item affinity values 54 for the corresponding identified user ("P1") 16 can represent the available network items 58 for which the identified user ("P1") 16 has expressed the highest interest. As illustrated in part (1) of step 80 in FIG. 3, the preferred network items (PNI) 120 can be filtered by the processor circuit 22 according to presentation context, as appropriate, for example based on limiting the preferred network items 120 to items that are relevant to the menus 66 or 106 having been presented to the user (for example, filtering out items that are not relevant to photography based on the user having been within the context of a photography store).

The processor circuit 22 also can identify in step 80 the closest network users (CNU) 118 based on identifying the network users providing the highest relative user affinity values 56 for each of the preferred network items (PNI) 120 based on their respective user selection preferences 34. For example, the item "I1" 62 illustrated in FIG. 8 includes within its item-user relationships entry 52 in FIG. 7 the network users "P362", "P259", etc. having the highest respective user affinity values "301" and "297" 56. As illustrated in FIG. 8, the network users "P362" and "P259" are added by the processor circuit 22 to the list of closest network users (CNU) 118 based on their having the strongest relationship with the preferred network item "I1": the processor circuit 22 can repeat the identification of network users providing the highest relative user affinity values, for each of the preferred network items (PNI) 120 based on retrieving the corresponding entry 52, resulting in the collection of the closest network users 118 that have the highest correlation of shared interests with the identified user ("P1") 16.

As illustrated in part (2) of step 80 in FIG. 3, the list of the closest network users 118 also can be filtered based on presentation context as appropriate; hence, if the presentation context is photography and the user 16 demonstrates numerous interests or hobbies (for example, sailing, politics, history, etc.) based on the user selection preferences 34 and other relationships 46, 48, the processor circuit 22 can filter in step 80 the network users 118 that are not relevant to the presentation context, such that only the photography-related network users 118 are accepted (as opposed to other network users that may share interests with the user 16 in sailing, politics, or history but that are unrelated to the presentation context of photography). Other user-user relationships 46 also can be applied as a filter.

Following determination of the closest network users 118 in step 80, the processor circuit 22 can determine in step 82 the preferred network items for each of the closest network users 118, based on the respective item affinity values 54 exhibited by the respective users 118 according to their respective user selection preferences (for example, the respective user-item relationships 48). The resulting set of the preferred network items for each of the closest network users 118 can be filtered to include only items not yet seen by the user "P1" 16, resulting in a set of new network items ("R") 122 that are most likely to be preferred by the identified user "P1" 16. The identification of items "most likely to be preferred by the identified user" refers to those items determined as having the greatest probability of satisfy the user's interest (or preference) in network items. As described previously, the personally interesting content 122 also can include network items that have previously been presented to the user 16. Hence, the network items 122 also can be referred to as the most "personally interesting content" to the user 16.

If in step 84 the initial user request does not include any network item selection (for example, initial device turn-on), the processor circuit 22 can execute a filtering function 124 in step 86 on the recommendations of network items 122: example parameters for the filtering function 124 can include known user preferences, for example the preferences specified in the user profile 32, age or content restrictions, scheduled preferences (for example, preferred morning news shows), browsing history, business rules, etc. The processor circuit 22, after filtering the network items 122 with the filtering function 124, can output in step 92 to the user device a recommendation 132 of at least one new network item (for example, "1455") 122 most likely to be preferred by the identified user 16. As illustrated in FIG. 8, the recommendation 132 also can be a prioritized list of network items that are most likely preferred by the user 16. Hence, a user 16 can receive in step 92 the recommendation 132 for at least one network item (new or previously presented) determined by the processor circuit 22 as most likely to be preferred by the identified user 16, based on socially collaborative filtering that identifies network items 122 that are most preferred by those network users 118 most closely related to the identified user 16. These network items 122 can be filtered based on known user preferences in order to provide the network item that is most likely to be preferred by the identified user, enabling the user to enjoy content without initially selecting any content, for example, a beginning webpage or a beginning television program upon activation of the corresponding user device 14.

If in step 84 the processor circuit 22 determines that the initial user request in step 70 included a user selection input (for example, 66a or 108) requesting selection of a particular network item (for example, "I1"), the processor circuit 22 can implement the filter 124 of FIG. 8 in step 88 based on the presentation context provided by the server 18 to the identified user 16.

FIG. 9 illustrates an example implementation by the processor circuit 22 of the filter 124 in step 88 of FIG. 3 by determining a group of network items 126 having the highest relation to the selected network item ("I1") 62. In particular, the processor circuit 22 can determine a group of network items 128 that have the highest relation to the selected available network item 62, based on identifying the group of network users 60 having the highest relative user affinity values 56 for the selected available network item 62, illustrated in FIG. 7; the processor circuit 22 can identify, for each user 60 having the relatively highest relation 56 to the selected item 62, the network items 128 that have the highest relative item affinity values 54 for each of the group of users 60 most closely associated with the selected item 62. Another context-based filter 130 can be applied to the group of network items 128, as appropriate (for example, item-item relationships 50), resulting in the list of items 126 that are highly related to the selected item "I1" 62.

Hence, the item-based filtering illustrated in FIG. 9 first identifies the group of network users 60 having the highest relative user affinity values 56 for the selected available network item 62, and then identifies the network items 128 that have the highest relative item affinity values 54 for each of the group of users 60 most closely associated with the selected item 62. Hence, the item-based filtering illustrated in FIG. 9 can provide varying strengths of relationships between items. Consequently, the item-based filtering illustrated in FIG. 9 is distinct from conventional item-based collaborative filtering that rely on Boolean relationships between items, where relationships are expressed as an item-item matrix determining relationships between pairs of items (i.e., either there exists a relationship between the pair or there does not).

The processor circuit 22 also can execute the filter 124 of FIG. 8 in step 90 based on applying the presentation context provided by the related items 126 (for example, performing an AND-based filtering between the personally interesting content 122 and the related items 126). The processor circuit 22 also can apply to the filter 124 in step 90 selected user preferences 134, for example the preferences specified in the user profile 32, age or content restrictions, scheduled preferences (for example, preferred morning news shows), browsing history, and/or business rules, etc. Hence, the processor circuit 22 can output in step 92 the recommendation 132 of at least one network item most preferred by the user "P1". The recommendation 132 can be implemented as a prioritized list or display of the network items, or a presentation of a single network item identified as the most likely preferred by the user 16. Hence, the recommendation 132 is equivalent to the recommendations 36 of FIG. 2. Hence, the processor circuit 22 can provide a network item that most likely will be preferred by the identified user 16 and that is uniquely recommended based on the personal tastes of the user 16 as demonstrated by the socially relevant gestures 40 of the user 16.

Hence, socially collaborative filtering can be implemented to provide personalized recommendations to a user based on user personal tastes that can be passively detected based on detecting socially relevant gestures by the user. The personalized recommendations can be updated in response to each detected input by the user, further providing context-appropriate recommendations.

Implementing an Advertisement Campaign Using Socially Collaborative Filtering

Figure 10:
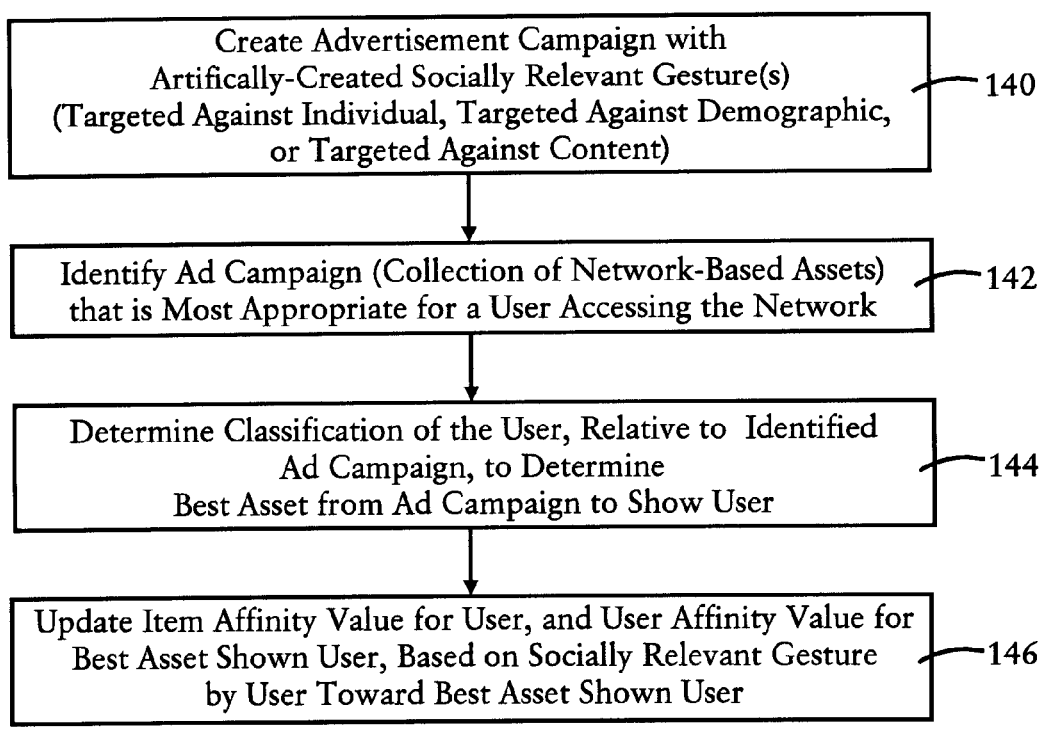
FIG. 10 illustrates an example summary of implementing an advertisement campaign using socially collaborative filtering according to an example embodiment.

FIG. 10 is a diagram summarizing an example method of implementing an advertisement campaign using socially collaborative filtering, according to an example embodiment. In particular, advertisement campaigns are implemented in numerous stages, beginning with creation of the advertisement campaign in step 140.

The advertisement campaign is created in step 140, where an "ad buy" is generated (for example, by the processor circuit 22 of FIG. 1) that targets the advertisement campaign against a targeted audience. The targeted audience can be detected with respect to defining an ideal individual that is identified as the perfect target for the advertisement campaign. The targeted audience also can be detected relative to a demographic that provides characteristics defining the ideal group of individuals that serve as the perfect target for the advertisement campaign. The targeted audience also can be detected relative to a specific targeted network content or network item or service, for example in the case where any user that consumes the targeted network content, item or service is the perfect target for the advertisement campaign (for example, in the case of an accessory advertised for use with the targeted network content or item). A particular feature of the creation of the advertisement campaign in step 140 is that relationships are established between the advertisement campaign and the campaign target (for example, an individual, demographic, or targeted item) based on artificially creating socially relevant gestures between the advertisement campaign and the campaign target. The socially collaborative filtering described above with respect to FIGS. 1-10 can be applied to insert the advertisement campaign into the system 10. Use of socially collaborative filtering in step 140 for creating an advertisement campaign is described in detail below with respect to FIGS. 11A, 11B, and 11C.

Socially collaborative filtering also can be applied in step 142, where the processor circuit 22 can respond to detecting the user 16 is accessing the network 12 using one of the user devices 14 by identifying an advertisement campaign that is most appropriate for the user, for example based on the known user preferences that enable generating the ordered list of personally interesting content 122 (illustrated in FIG. 8), and/or based on filtering the personally interesting content 122 with related items relative to the presentation context of the user 126 or selected user preferences 134. Use of socially collaborative filtering in step 142 for identifying an advertisement campaign that is most appropriate for the user 16 is described in detail below with respect to FIG. 12.

Socially collaborative filtering also can be applied in step 144, where the processor circuit 22 can classify the identified user into one of multiple user affinity categories relative to an advertisement campaign for a targeted product, and determine the best advertisement asset from the advertisement campaign that should be delivered to the identified user 16 based on the classification of the identified user into the one user affinity category. Use of socially collaborative filtering in step 144 for determining a classification of the user and determining the best advertisement asset from the campaign based on classifying the user into a selected user affinity category is described in further detail below with respect to FIGS. 13-16.

The socially collaborative filtering also can be applied in step 146, where the processor circuit 22 can update the item the affinity values 54 for the user 16 (illustrated in FIG. 6), and the user affinity value 56 for the advertisement asset delivered to the user 16 (illustrated in FIG. 7), in response to detecting a user selection by the user 16 that represents a socially relevant gesture toward the advertisement asset delivered to the user. Hence, use of socially collaborative filtering to track the responses of users to advertisement assets enables the processor circuit 22 to dynamically change the advertisement campaign based on whether the users respond positively or negatively to the ad. Hence, the processor circuit 22 over time can improve the effectiveness of the advertisement campaign, based on the socially relevant gestures by the users, by increasing use of the advertisement assets that are more effective toward promoting the targeted product of the advertisement campaign, and decreasing use of the advertisement assets that are less effective toward promoting the targeted product of the advertisement campaign.

Hence, socially collaborative filtering can be implemented within any one of the steps 140, 142, 144, or 146 involved in implementing an advertisement campaign. In addition, each of the steps of FIG. 10 operate independently of each other, enabling any one of the steps of FIG. 10 to be applied to conventional campaigns. For example, step 144 can be implemented in a conventional advertisement campaign where a user is presented with a predetermined advertisement campaign, and the processor circuit 22 classifies the user 16 to determine the best advertisement asset from the predetermined advertisement campaign to present to the user 16.

Figure 11A:
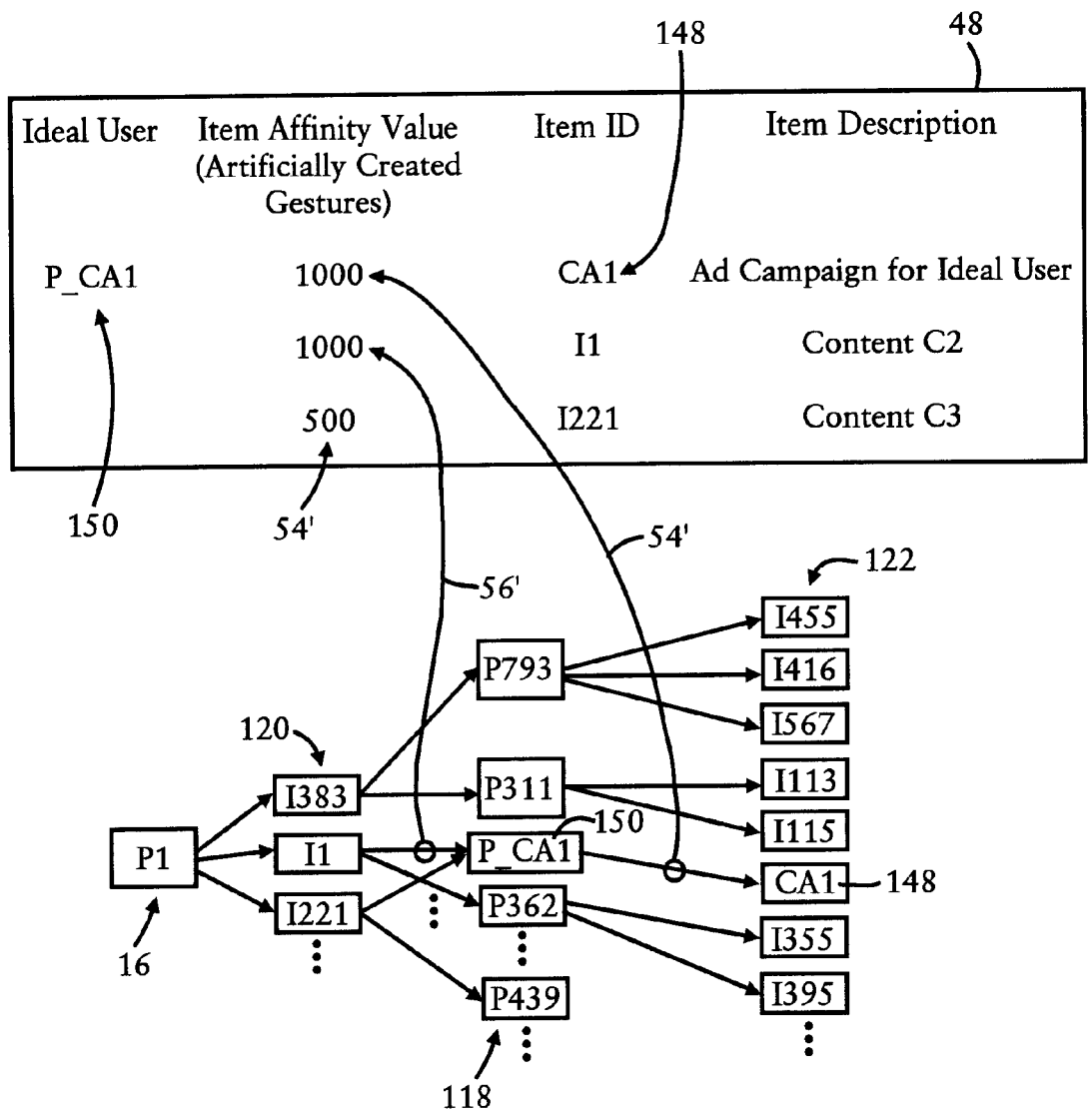
FIGS. 11A, 11B, and 11C illustrates example creation of an advertisement campaign based on artificially creating social gestures relative to an ideal user, an identifiable demographic, or a target network item, according to an example embodiment.
Figure 11B:
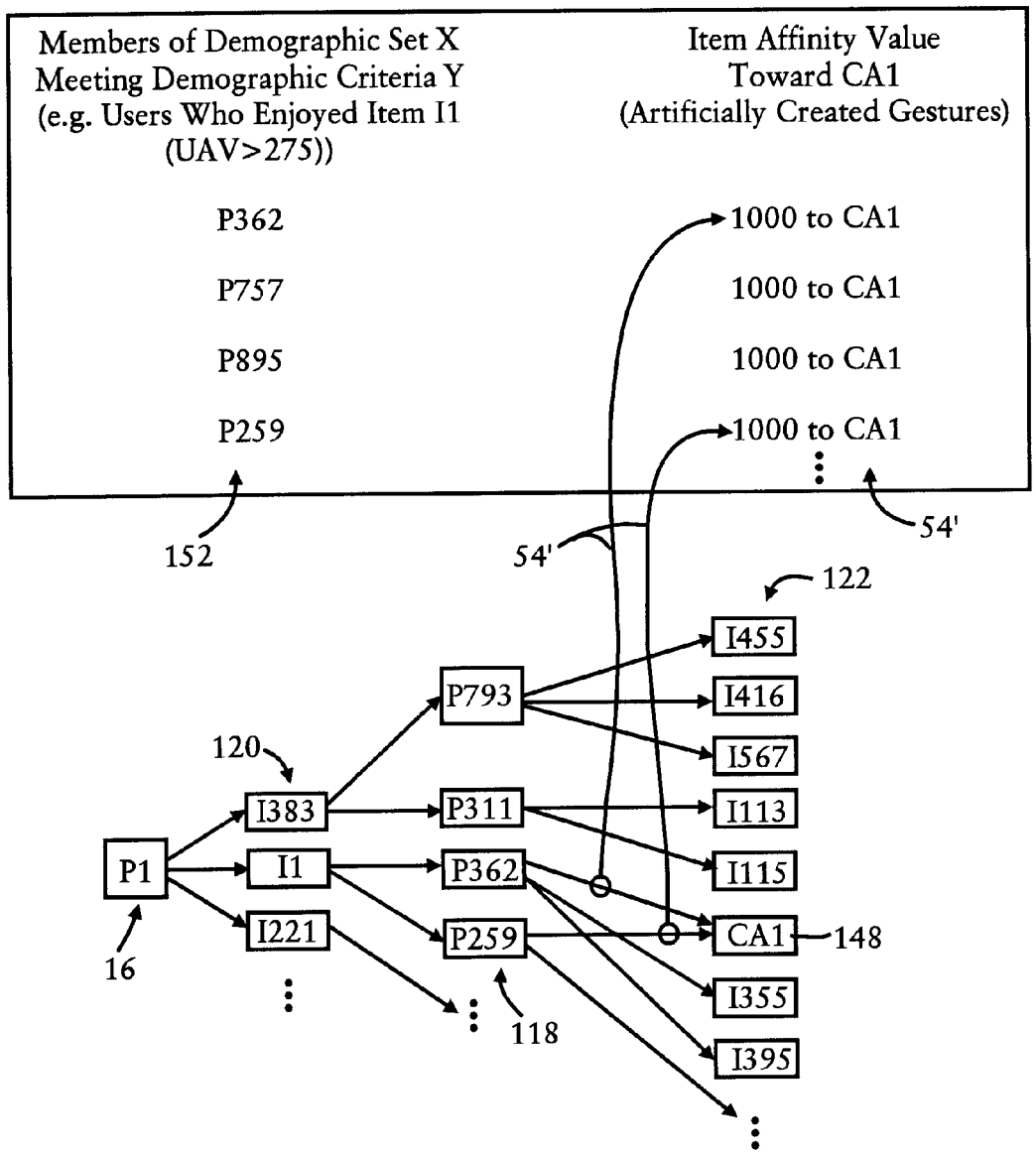
Figure 11C:
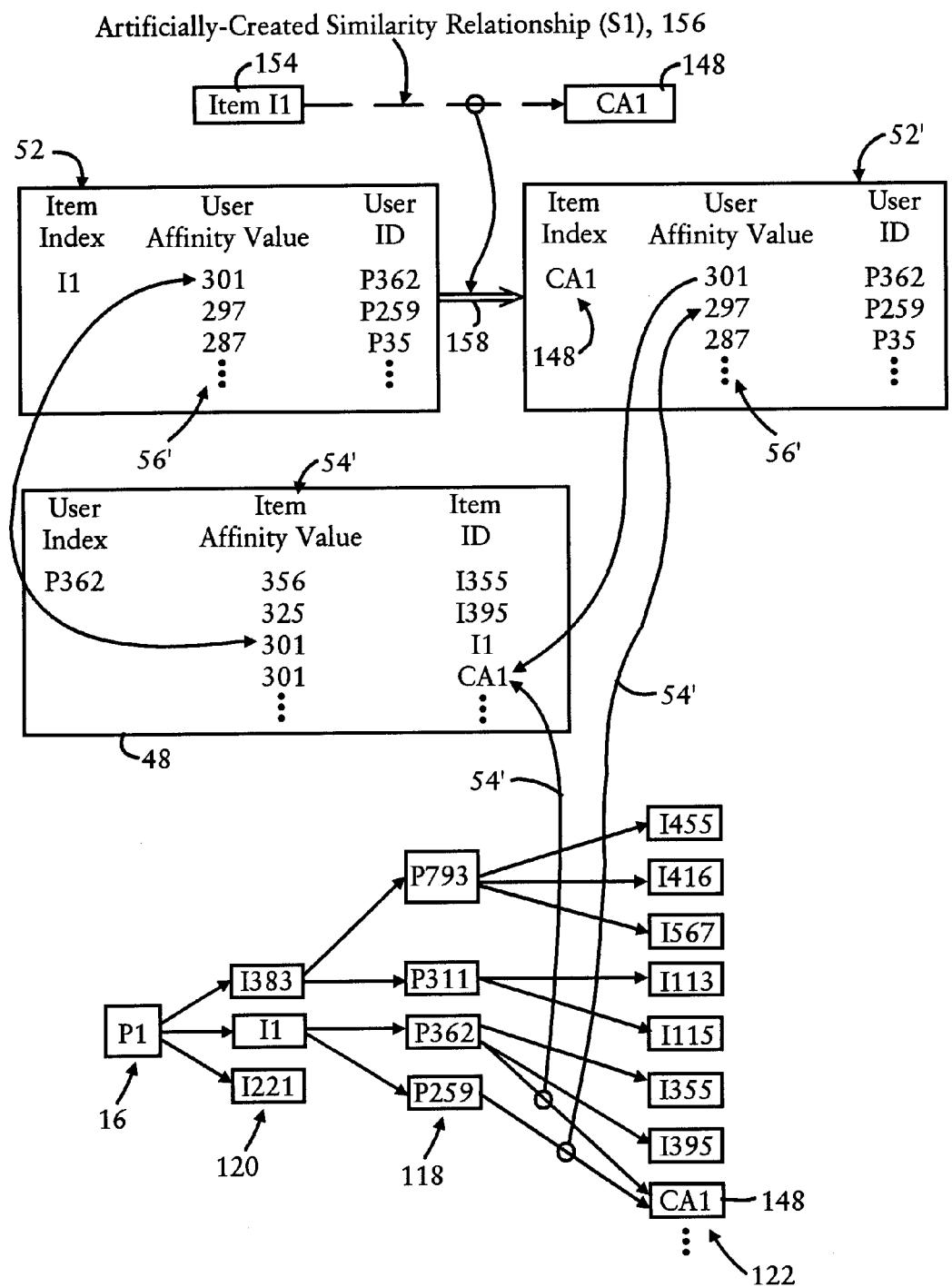

FIGS. 11A, 11B, and 11C illustrate example methods for creating an advertisement campaign using artificially created socially relevant gestures, according to an example embodiment. In particular, an advertisement campaign (illustrated as "CA1") 148 is created in the form of an available network item that can be stored in the item database 26 of FIG. 1. In addition, the advertisement campaign 148 can have a corresponding set of item-user relationships 52 (illustrated in FIG. 7) that identify user affinity values 56 for respective users 16 based on their user identifiers 60.

The advertisement campaign 148 is introduced to the network 12 by the processor circuit 22 artificially creating socially relevant gestures between the advertisement campaign 148 and a target audience in the system 10 in the form of item affinity values 54' and/or user affinity values 56', as appropriate. Hence, the artificially created socially relevant gestures enable the processor circuit 22 to discover the advertisement campaign 148 while performing socially collaborative filtering to identify personally interesting content 122 (illustrated in FIGS. 8 and 11), or related items 126 (illustrated in FIGS. 8 and 9). In addition, the updating of socially relevant gestures as illustrated in step 146 of FIG. 10 enables the processor circuit 22 to update the artificially-created socially relevant gestures (for example, a user affinity value 56' or the item affinity value 54' between the advertisement campaign 148 and a specific user 16), that can be initially set with substantially strong affinity values between the advertisement campaign 148 and the target audience, with actual socially relevant gestures based on detecting the user response to the selected advertising asset of the advertisement campaign 148 that is chosen for the user 16.

FIG. 11A illustrates an example method of creating the advertisement campaign 148 using the artificially created socially relevant gesture in the form of an artificially created item affinity value 54' for an ideal user 150. The ideal user ("P_CA1") 150 is defined by an advertiser as the perfect target individual for the given advertisement campaign ("CA1") 148. Hence, the advertiser causes the processor circuit 22 to artificially create the initial user-item relationships 48 that include the artificially-created item affinity values 54' toward the advertisement campaign 148, as well as other available network items that define the attributes of the ideal user 150 (for example, the ideal user has a substantially strong positive item affinity values 54' for hunting and fishing goods (C2) and accessories, camping equipment (C3)).

Hence, as illustrated in FIG. 11A, if another user "P1" 16 is accessing the network as described previously with respect to FIG. 8, the processor circuit 22 can identify from the ordered list of preferred network items 120 for the user 16 that one of the closest network users 118 includes the ideal user 150, and generate the personally interesting content 122 that includes the advertisement campaign 148.

FIG. 11B illustrates an example method of creating the advertisement campaign 148 using the artificially created socially relevant gesture in the form of the artificially created item affinity value 54' for a given demographic set 152 of users 16 that satisfy a prescribed demographic criteria "Y". The example of FIG. 11B is similar to the example of FIG. 11A, except that instead of defining an ideal user 150, the demographic criteria "Y" are used to identify the set 152 of users 16 that satisfy the criteria. Since the users 16 already have their own user-item relationships 48 as illustrated in FIG. 6, the processor circuit 22 can implement the advertisement campaign 148 by assigning to each of the users 16 within the prescribed demographic set 152 the substantially strong affinity value 54' toward the advertisement campaign 148 as a corresponding input to each of the user selection preferences that are implemented in FIG. 6 as the user-item relationships. Hence, the artificially-created item affinity value 54' toward the advertisement campaign 148 is added to the user item relationships 48 of each user 16 within the demographic set 152.

Hence, as illustrated in FIG. 11B, if another user "P1" 16 is accessing the network as described previously with respect to FIG. 8, the processor circuit 22 can retrieve the advertisement campaign 148 for the personally interesting content 122 of the user "P1" 16 based on identifying that at least one of the closest network users 118 (for example user "P362" and user "P259") includes the item affinity value toward the advertisement campaign 148.

As illustrated in FIG. 11B the demographic criteria "Y" can be implemented in the form of identifying all users who have enjoyed a given available network item ("I1"), for example based on determining that the corresponding user affinity value (UAV) 56 has a value greater than 275. In this example of defining the demographic criteria in the form of identifying all users who have enjoyed a given available network item ("I1"), the example of FIG. 11B also can serve as targeting the advertisement campaign 148 against the existing network item "I1".

FIG. 11C illustrates another example method of creating the advertisement campaign 148 targeted against a given item 154, based on artificially creating a socially relevant gesture referred to as a "similarity relationship" (SI) 156 between the target content 154 and the advertisement campaign 148. The target content 154 does not represent the "targeted product" of the advertisement campaign 148; to the contrary, the target content 154 refers to the target "demographic" as illustrated in FIG. 11B to which the advertisement campaign 148 is directed. Hence, the target content 154 can be implemented as any available network item, and also can include a uniform resource identifier (URI) or uniform resource locator (URL), a collection of keywords or metadata from a webpage viewed by the user 16, etc.

The similarity relationship 156 causes the processor circuit 22 to inject the advertisement campaign 148 into the item database 26 based on replicating in step 158 the item-user relationships 52 of the item 154 into replicated item-user relationships 52' for the advertisement campaign 148. Hence, the advertisement campaign 148 also can be added to the corresponding user-item relationships 48 for the users identified in the replicated item-user relationships 52'. Hence, as described above with respect to FIG. 11B, the similarity relationship 156 causes creation of the artificial item affinity values 54' between the target item 154 and the advertisement campaign 148 to be added to the ordered list of personally interesting content 122.

The replicated item-user relationships 52' and the updated user-item relationships 48 that are generated based on the similarity relationship 156 can cause the processor circuit 22 to automatically inject the advertisement campaign 148 into the list of personally interesting content 122 illustrated in FIG. 11C, and/or the list 128 of network items having the highest relation to the item 154 illustrated in FIG. 9. As illustrated with respect to FIG. 9, the processor circuit 22, in response to detecting the similarity relationship 156, can automatically add the advertisement campaign 148 to the list 128 of network items having the highest relation to the item 154 (identified by reference 62 in FIG. 9). Hence, the similarity relationship 156 can be used to add the advertisement campaign 148 as an available network item to both the collection of personally interesting content 122, and the list of content that is highly related to the target item 154.

Once the advertisement campaign 148 has been created, the processor circuit 22 can begin selecting the specific advertisement campaign ("CA1") 148 from among multiple advertisement campaigns available in the network 12, according to the content that is most appropriate for the user 16 according to a given presentation context.

Figure 12:
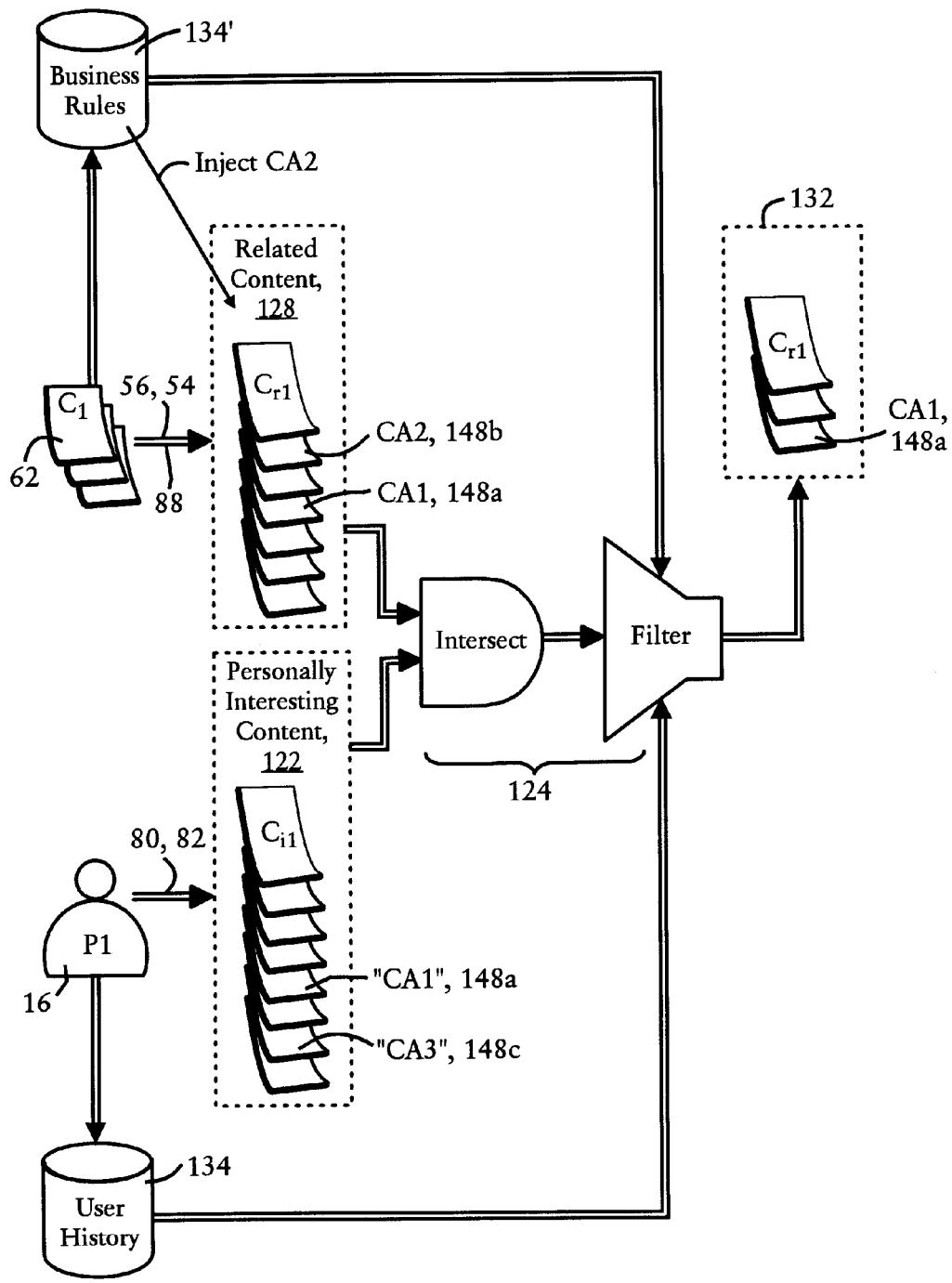
FIG. 12 illustrates a variation of FIG. 8 for identification of an advertisement campaign within a prioritized list of network items most likely to be preferred by an identified user, according to an example embodiment.

FIG. 12 is a diagram illustrating the method of selecting an advertisement campaign from one of a plurality of advertisement campaigns for respective target products, according to an example embodiment. FIG. 12 is functionally identical to FIG. 8, with additional illustration with respect to the availability of multiple advertisement campaigns 148a, 148b, and 148c.

As described in detail with respect to FIG. 8, the processor circuit 22 can determine the personally interesting content 122 in FIG. 12 based on determining in step 80 a group of the closest network users 118 having the highest correlation of shared interests with the identified user 16, based on identifying the preferred network items 120 having the highest relative affinity values 54 generated for the identified user 16, and identifying the closest network users 18 providing the highest relative user affinity values 56 for each of the preferred network items 120 based on the respective user selection preferences. The processor circuit 22 also can determine the ordered list 122 of personally interesting content, namely the network items most likely to be preferred by the identified user, based on identifying from the network items not presented to the identified user the preferred network items for each of the closest network users 118 based on the respective user selection preferences (illustrated as item affinity values 54) of the closest network users 118. As described above with respect to FIGS. 11A, 11B, and 11C, the personally interesting content 122 can include one or more advertisement campaigns, for example the advertisement campaigns "CA1" 148a and "CA2" 148b.

As illustrated in FIG. 12, the ordered list of related content 128 representing network items related to the context 62 presented to the identified user 16 includes the advertisement campaigns "CA1" 148a and "CA2" 148b as related to the context 62 presented to the identified user. As illustrated in FIG. 9, the filtering of the related content 128 results in the related items 126; hence, the filtering 130 of FIG. 9 is illustrated in FIG. 12 as part of the filtering 124. The processor circuit 22 may apply prescribed business rules 134' associated with the context 62, for example implementing the similarity relationship 156 of FIG. 11C, in order to inject one of the advertisement campaigns (for example, the advertisement campaign "CA2" 148b). As described in detail with respect to FIG. 9, the processor circuit 22 also can determine in step 88 of FIG. 3 that the advertisement campaign "CA1" 148a is related to the context 62 presented to the identified user 16.

Hence, the processor circuit 22 can filter the ordered list 122 of personally interesting content with the second list 128 of network items related to the context 62 presented to the identified user 16, applying the filter 124 that includes both a logical AND intersection operation and a filtering according to the user history 134 and the business rules 134', described above. Also note the business rules 134' may include additional parameters related to the advertisement campaign, for example if an advertiser has depleted the account funds that were applied for the advertisement campaign, the business rules 134' may require the depleted advertisement campaign to be deleted from the results 132 of network items most likely preferred by the user 16.

Hence, as illustrated in FIG. 12, the results 132 of network items most likely preferred by the user 16 can include the advertisement campaign 148a based on filtering the personally interesting content 122 relative to the related content 128 for the given presentation context 62, consistent with the user history 134 and the business rules 134'. Hence, the processor circuit 22 can select the advertisement campaign (for example, "CA1" 148a) to be applied to the user, from multiple advertisement campaigns.

FIGS. 13-16 illustrate example methods for classifying a user 16 by the processor circuit 22 into one of multiple user affinity categories 160 (illustrated in FIG. 16) relative to the advertisement campaign 148 for a targeted product 162, according to an example embodiment. In particular, once a given advertisement campaign has been chosen by the processor circuit (or has been predetermined for presentation to the user based on external marketing factors or influences), the example embodiments classify the user 16 based on his or her socially relevant gestures, in order to identify the most appropriate advertisement asset of the advertisement campaign 148 to be presented to the user 16.

Figure 16:
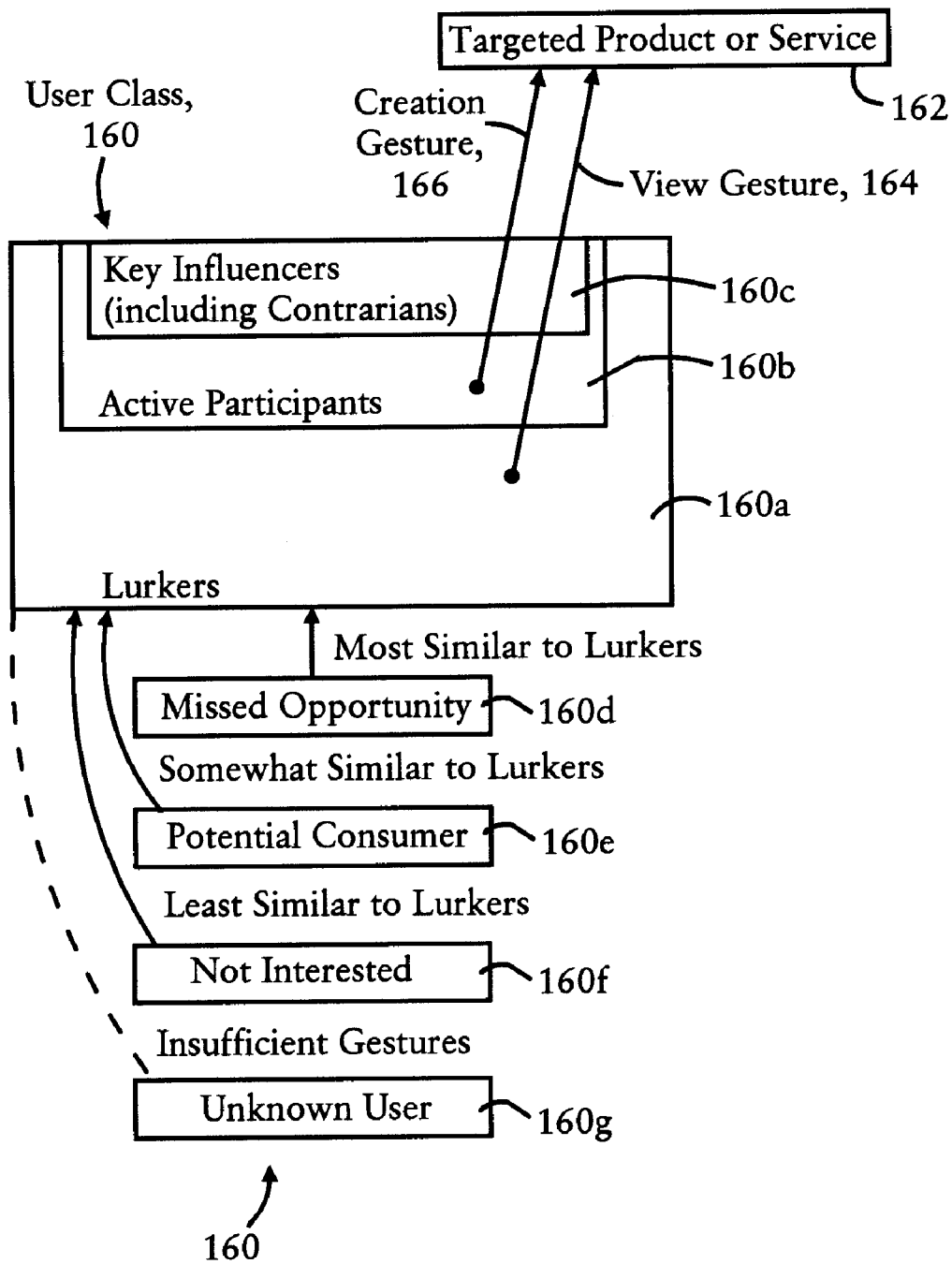
FIG. 16 illustrates example user classifications relative to a targeted product or service, based on socially relevant gestures generated by a user relative to the targeted product or service.

In particular, FIG. 16 illustrates multiple user affinity categories 160 relative to an advertisement campaign 148 for the targeted product 162. For example, the available user affinity categories 160 include a lurker category of users 160a that includes a subcategory of active participants 160b that further includes a subcategory of key influencers 160. The lurker category of users 160a is defined as including any and all users 16 that have demonstrated at least a view gesture 164 toward the targeted product or service 162. For example, if the targeted product or service 162 is a website, then a viewing of that website by the user 16 is recorded by the processor circuit 22 as a view gesture; the viewing of online content, for example an online movie or television show also is recorded by the processor circuit 22 as a view gesture. As described above, the view gesture also can be recorded as a percentage of the time viewed relative to the total viewing time of the targeted product or service 162, resulting in strongly positive, neutral, or strongly negative view gesture; hence, all users that belong to the lurker category 160a have at least the view gesture 164, although the view gesture may be strongly positive, neutral, or strongly negative. Hence, the corresponding advertisement asset for the lurker category may include incentives for additional consumption of the targeted product or service 162, or challenges for lurkers having demonstrated negative view gestures 164.

The subcategory of active participants 160b are distinguishable from the lurker category 160a in that each user who is part of the active participants categories 160b has both a view gesture 164 and a creation gesture 166. As described above, the creation gesture 166 can be recorded by the processor circuit 22 in response to detecting that the user 16 is creating new network content (for example, a user comment, a user rating, etc.) that is related to the targeted product or service 162 either directly or indirectly (for example, commenting on another person's comment related to the targeted product 162). Hence, the corresponding advertisement asset for the active participant category may include rewards for loyalty, or more attractive challenges for active participants having demonstrated negative creation gestures 166

The subcategory of key influencers 160c is distinguishable from the active participants category 160b in that the key influencers 160c have a sufficiently large number of creation gestures 166 that generate substantially favorable gestures by other users having viewed the content created by the key influencers 160c. Hence, if an active participant 160b has only generated a few creation gestures 166 that are insufficient to generate a substantial number of gestures by other users, the active participant 160b can be automatically disqualified from being considered as a key influencer 160c. Hence, the corresponding advertisement asset for the key influencers category 160c can include other additional rewards, an offer to participate in beta testing of new products or new advertisement campaigns, or an offer to suggest an employment opportunity with the company offering the targeted product or service 162. The corresponding advertisement asset for the key influencers 160c who are contrarians that strongly dislike the targeted product 162 can include an offer to meet with a representative to discuss suggestions for improvement, etc. Additional details regarding identifying key influencers 160c is described below with respect to FIG. 15.

Of importance to advertisers is reaching not only the users that have viewed the targeted product or service 162, but also reaching other users that have not viewed, or are aware of, the targeted product or service 162. Hence, the example embodiments also classify users that have no view gesture 164 relative to the targeted product or service 162, based on their relative similarities to the lurkers. For example, the class of user affinity categories also includes a missed opportunity category of users 160d, a potential customer category of users 160e, a not interested category of users 160f, and an unknown user category of users 160g.

The missed opportunity category of users 160d identifies users 16 that do not have the view gesture 164 relative to the targeted product 162, but which have the highest correlation of shared interests with the lurker category of users 160a. In other words, the missed opportunity category of users 160d can identify those users who are not aware of the targeted product 162, but if made aware of the targeted product 162 will have the greatest likelihood of enjoying the targeted product based on their substantial similarity to the lurker category of users 160a. Hence, the missed opportunity category of users 160d can be particularly important for advertisers attempting to effectively reach new customers for the targeted product or service 162. The corresponding advertisement asset for the missed opportunity category of users may include an advertisement stressing shared similarity with the lurker category 160a.

The potential consumer category of users 160e identifies users 16 that do not have the view gesture 164 relative to the targeted product 162, and which have a lower correlation of shared interests with the lurker category of users 160a than the missed opportunity category of users 160d. In other words, the potential customer category of users 160e can identify those users who are not aware of the targeted product 162, and who may consider consuming the targeted product 162 if provided with a corresponding advertisement asset offering a sufficient incentive (for example, free trial, discounts, etc.).

The not interested category of users 160f identifies users 16 that do not have the view gesture 164 relative to the targeted product 162, and which have the lowest correlation of shared interests with the lurker category of users 160a relative to the missed opportunity category of users 160d and the potential customer category of users 160e. In other words, the not interested category of users 160f can identify those users who have no interest at all in the targeted product or service 162, enabling advertisers to decide whether to offer additional incentives for consuming the targeted product 162, or decide to avoid wasting advertisement resources on the users that are not interested.

The last class of users include the unknown user category 160g that have an insufficient number of socially relevant gestures to enable the processor circuit 22 to determine how to classify the unknown user. Hence, the corresponding advertisement asset may provide a more neutral introduction to the targeted product or service 162. As described above with respect to step 146 of FIG. 10, as additional socially relevant gestures are recorded for the user, the user may move to from the unknown user category 160g to one of the other categories based on the associated socially relevant gestures.

Figure 13:
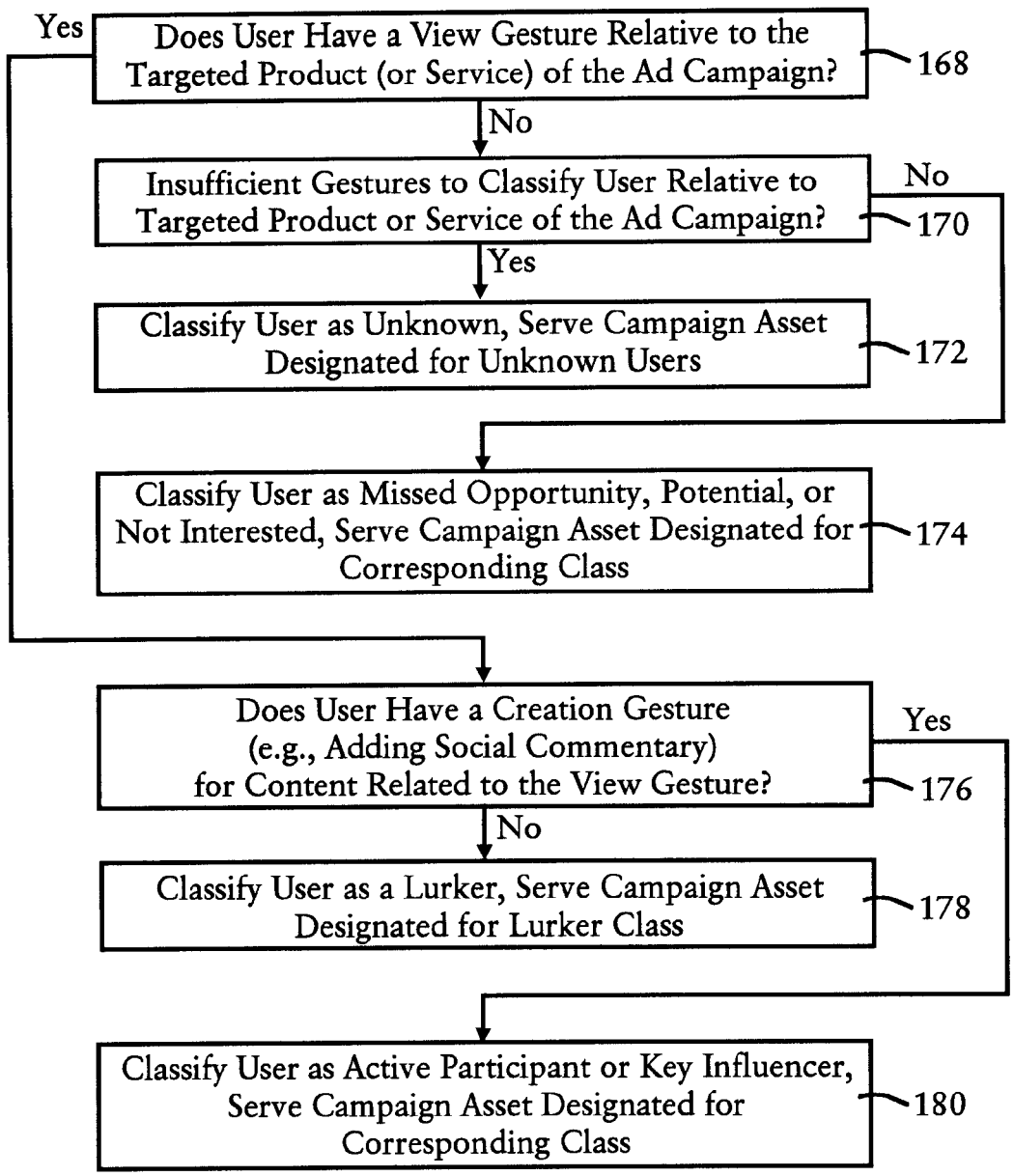
FIG. 13 illustrates an example method summarizing classification of a user relative to the advertisement campaign identified in FIG. 12, according to an example embodiment.

Referring to FIG. 13, the processor circuit 22 can classify the identified user 16 into one of the multiple user affinity categories 160 relative to the advertisement campaign 148 for the targeted product 162 based on analyzing the socially relevant gestures for the identified user 16. The processor circuit 22 determines in step 168 whether the identified user has a view gesture 164 relative to the targeted product or service 162 of the advertisement campaign (for example, "CA1") 148.

If the processor circuit 22 determines the identified user 16 does not have the view gesture 164 relative to the targeted product or service 162, the processor circuit 22 determines in step 170 if socially collaborative filtering can be performed at all, or whether the identified user 16 has insufficient gestures to classify the user into one of the identifiable categories 160*a*, 160*d*, 160*e*, or 160*f*. If the processor circuit 22 determines the identified user 16 has insufficient gestures for classifying the user into one of the specific user categories requiring a similarity analysis with the lurkers class 160*a*, the processor circuit 22 classifies in step 172 the user as an unknown user class 160*g*, and serves a corresponding campaign asset assigned to unknown users for the advertisement campaign 148.

If in step 170 the processor circuit 22 determines that the user 16 that lacks the view gesture 164 has sufficient socially relevant gestures for classification, the processor circuit 22 can classify the user 16 in step 174 as either within the missed opportunity class 160*d*, the potential customer class 160*e*, or the not interested class 160*f*. Upon classifying the user 16 in the appropriate class, the processor circuit 22 can provide the corresponding advertisement asset based on the classification. Additional details with respect to implementing the classification in step 174 is described below with respect to FIG. 14.

If in step 168 the processor circuit 22 determines that the user has a view gesture 164 relative to the targeted product or service 162 of the advertisement campaign 148, the processor circuit 22 can determine in step 176 whether the user should be classified as a lurker in step 178 based on determining whether the identified user 16 has a corresponding creation gesture 166 for content related to the view gesture 164 that is related to the targeted product or service 162.

As described above, a determination in step 176 can be based on a single relevant creation gesture, although additional heuristics may be applied in order to determine a minimum number of relevant creation gestures that are necessary to distinguish between the active participants category 160*b* and the lurkers category 160*a*. Assuming the processor circuit 22 determines the user 16 has insufficient relevant creation gestures 166 to be considered in the active participant category 160*b*, the processor circuit 22 classifies in step 178 the user 16 as part of the lurker category of users 160*a*, and serves the corresponding campaign asset of the advertisement campaign "CA1" 148 that is designated for the lurker class of users 160*a* for the targeted product or service 162. As described previously, distinctions may be identified for different campaign assets of the advertisement campaign "CA1" 148 for the lurker class of users 160*a* depending on the level of specificity within the view gestures 164, such that lurkers having positive view gestures may receive one set of advertisement assets, lurkers having negative view gestures may receive a different set of advertisement assets, etc. In addition, more specific advertisements can be sent if the view gestures include timing index information that correlate to a particular plot line in the content that occurred that cause the lurker to halt viewing the targeted product or service.

If in step 176 the processor circuit 22 determines that the user 16 has sufficient creation gestures 166 identifying generation of new network content related to the view gesture 164, the processor circuit 22 can classify in step 180 the user 16 as either an active participant 160*b* or a key influencer 160*c*, and serve the corresponding campaign asset that is designated for the one corresponding class within which the user is classified. Additional details with respect to classifying step 180 the user as either an active participant 160*b* or a key influencer 160*c* is described below with respect to FIG. 15.

Figure 14:
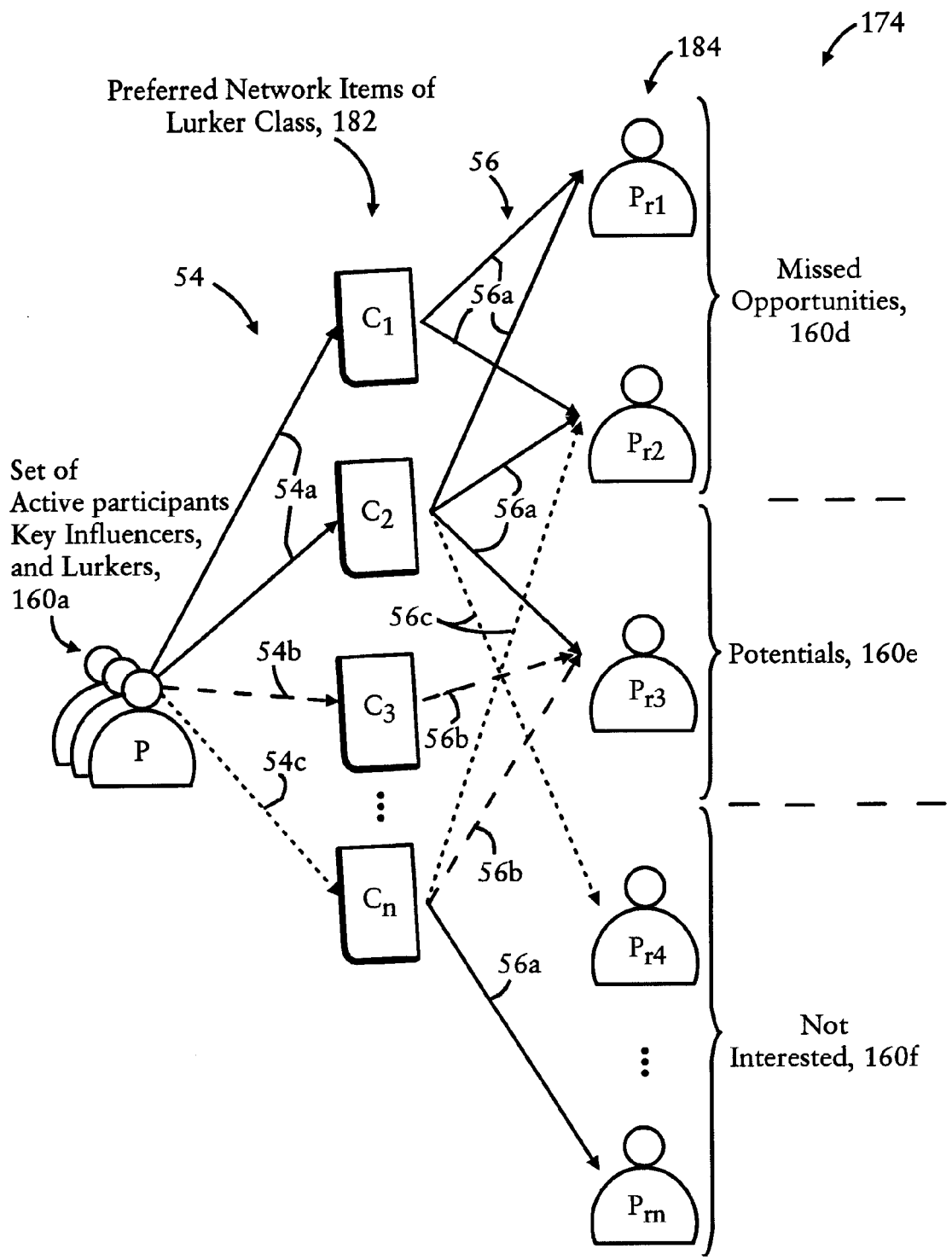
FIG. 14 illustrates an example method from FIG. 13 of classifying the user as a missed opportunity, a potential customer, or not interested relative to the identified advertisement campaign, according to an example embodiment.

FIG. 14 illustrates an example method by the processor circuit 22 of determining in step 174 of FIG. 13 whether a user 16 should be classified as within the missed opportunity category 160*d*, the potential consumer category 160*e*, or the not interested category 160*f*, according to an example embodiment. As illustrated in FIG. 14, the classifying includes the processor circuit 22 generating a first ordered list 182 of the preferred network items having the respective item affinity values generated for the lurker category of users 160*a*. Hence, the first ordered list 182 is identical to the ordered list 120 of FIG. 8, except that the ordered list 128 is based on the respective item affinity values 54 of the members of the lurker category of users 160*a*, which according to set theory also will include the active participants category of users 160*b* and the key influencers category of users 160*c*. As described previously, the ordered list of the preferred network items 182 is ordered based on the respective item affinity values generated for the lurker category of users 160*a*; hence, network items having the aggregation of most positive gestures 54*a* implemented as aggregated item affinity values having large positive values are ordered at the top of the list 182, the network items having the aggregation of neutral gestures 54*b* are ordered below the most positive gestures 54, and the network items having the aggregation of negative gestures 54*c* are ordered below the neutral gestures 54*b*.

The processor circuit 22 generates from the preferred network items of the lurker class 182 a second ordered list 184 of the identified network users that are distinct from the lurker category of users 160*a*. As illustrated in FIG. 14, the second ordered list 184 of the identified network users are ordered based on their relative socially relevant gestures (mirrored from item affinity values 54*a*, 54*b*, and 54*c* to user affinity values 56*a*, 56*b*, and 56*c*), such that the most positive socially relevant gestures 56*a* with respect to a given item (for example, C1) moves the user (for example, Pr1) toward the top of the ordered list 184. Similarly, a positive gesture 56*a* of an item (for example, Cn) that is least liked by the lurker class 160*a* results in moving a user (for example, Prn) further down the ordered list 184. Conversely, a negative gesture 56*c* of an item (for example, Cn) that is least liked by the lurker class 160*a* results in the multiplication of two negative factors resulting in a larger positive factor, resulting in the processor circuit 22 moving the user having expressed the negative gesture 56*c* (for example, Pr2) further toward the top of the second ordered list 184.

Hence, the ordered list 184 of the identified network users that are distinct from the lurker category of users 160*a* orders the users according to their similarity to the lurker class 160*a*, with the missed opportunities category 160*d* at the top of the ordered list and the not interested category 160*f* at the bottom of the list. Hence, an identified user 16 (for example, Pr2) can be classified in one of the classes 160*d*, 160*e*, or 160*f* depending on the relative position of the identified user 16 within the ordered list 184. The exact numerical boundaries of the relative position can be variable based on the size and magnitude of the values in the list.

Figure 15:
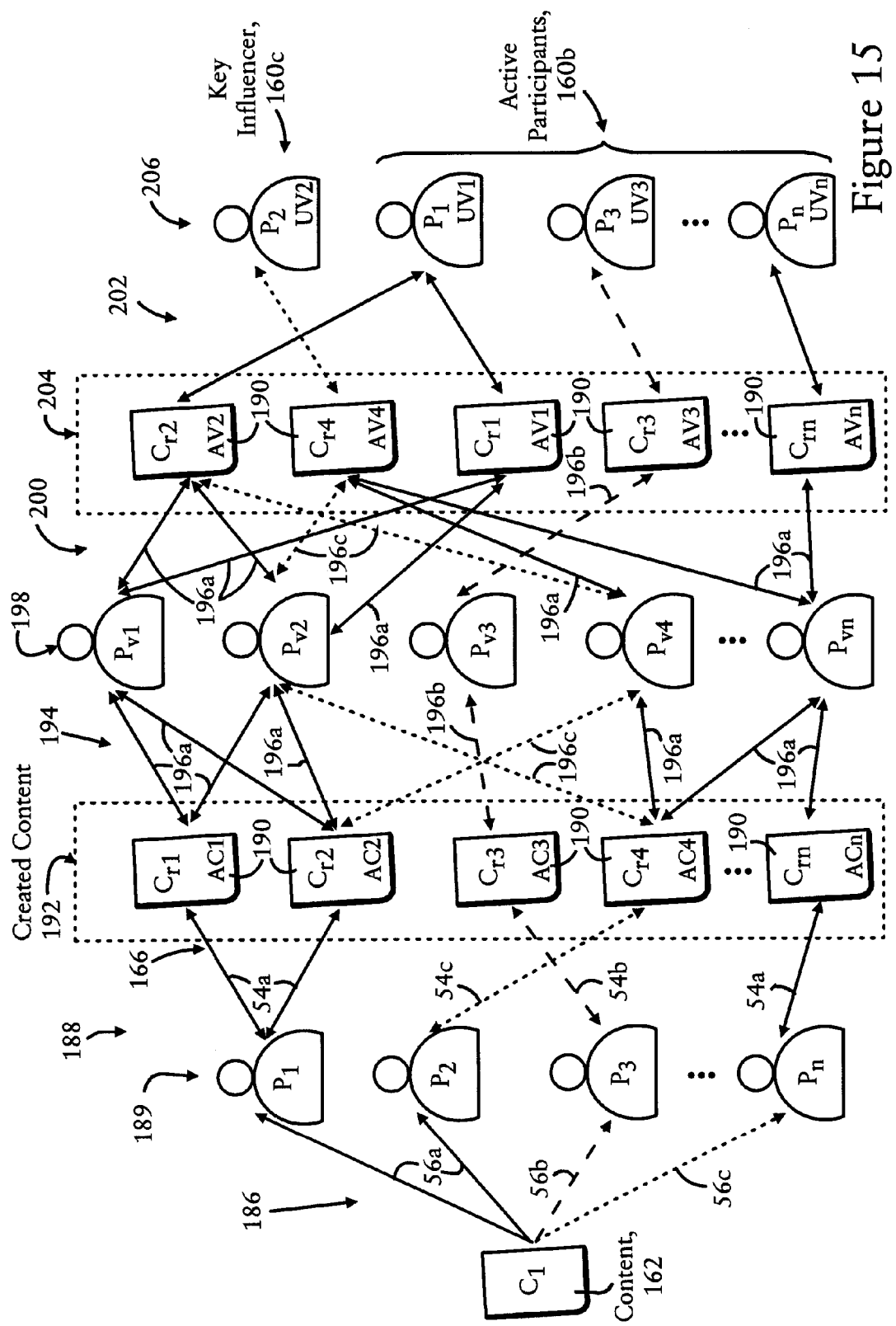
FIG. 15 illustrates an example method from FIG. 13 of classifying the user as an active participant or a key influencer relative to the identified advertisement campaign, according to an example embodiment.

FIG. 15 illustrates an example method by the processor circuit 22 of determining in step 180 of FIG. 13 whether an identified user is classified as belonging to the active participant category 160*b* or the key influencer category 160*c*, according to an example embodiment. The method begins by the processor circuit 22 first generating in step 186, for the targeted product or service 162, a first ordered list 189 of the lurkers 160a, the active participants 160b, and the key influencers 160c having viewed the content 162 based on the respective user affinity values toward the targeted product 162. As illustrated in FIG. 15, the ordering 189 can be based on the most positive gestures in the form of positive user affinity values 56a, neutral user affinity values 56b, and negative user affinity values 56c.

As described previously, the user affinity value 56 for a given user can be implemented based on at least one view gesture by the user that is detected by the processor circuit 22, although the user affinity value 56 also can be based on a ratings input by the user. For example, a view gesture 164 can be recorded as a percentage of viewed content relative to total content, as opposed to a digital value specifying whether the user has used the targeted content 162. Hence, FIG. 15 illustrates within the ordered list 189 that the user "P1" has the most positive user affinity value 56a toward the content 162 (for example, "UAV(C1_P1)=200"). The processor circuit 22 can generate the corresponding positive user affinity value 56a (UAV(C1_P1) for the user "P1" based on accumulating multiple gestures by the user "P1", for example multiple view gestures by the user "P1" toward the content 162 by the user P1, plus a maximum positive rating gesture of "5 stars" that was input by the user "P1" toward the content 162.

In contrast, FIG. 15 illustrates within the ordered list 189 that the user "Pn" has the most negative user affinity value 56c (for example, "UAV(C1_Pn)=–200") toward the content 162. The processor circuit 22 can determine the corresponding negative user affinity value 56c for the user "Pn" based on the user "Pn" expressing a shortest permissible view gesture relative to a prescribed minimum threshold (for example, the user "Pn" having a view gesture indicating only ten percent of the content 162 was viewed); the negative user affinity value 56c also can be based on an accumulation of one or more rating gestures with a maximum negative rating gesture of "1 star" that was input by the user "Pn" toward the content 162.

The processor circuit 22 evaluates in step 188 the creation gestures 166 and their respective item affinity values 54 for newly created content 190 that is created by the users in the ordered list 189, and generates an ordered list 192 of the created content 190. The ordered list 192 of created content 190 is ordered by the processor circuit 22 determining affinity correlation values (AC) relative to the content 162, such that the content "Cr1" has a highest affinity correlation value ("AC1"), indicating that users that most enjoy the content "C1" 162 also will most enjoy the content "Cr1" 190, analogous to the ordered list 128 in FIG. 9. Similarly, the users that most enjoy the content "C1" will most dislike the content "Crn". In contrast, the users that most dislike the content "C1" 162 will most likely enjoy the content "Crn" and dislike the content "Cr1".

The affinity correlation values (for example, "AC1" for the item "Cr1") are based on evaluating the respective creation gestures 166 and the respective item affinity values 54 relative to the user affinity values 56 of the users that created the content 190 toward the content 162. For example, assume the user "P1" created the content "Cr1" 190 and "Cr2" in the form of a commentary expressing extremely favorable opinions toward one or more network items that can be related or unrelated to the content 162, causing the processor circuit 22 to record the respective creation gestures 166 with respective positive item affinity values 54a (for example, "IAV(P1_Cr1)=100" and "IAV(P1_Cr2)=75"); hence, the respective affinity correlation values ("AC1", "AC2") can be based on multiplying the respective item affinity values 54a with the user affinity value (UAV(C1_P1)=200) 56a of the user "P1" that authored the content "Cr1" and "Cr2", resulting in the respective affinity correlation values "AC1=20,000" and "AC2=15,000". The affinity correlation values also can be determined by alternative methods other than the illustrated multiplication of an item affinity value with user affinity value, where the alternative methods preserve the relative order of the input values.

The user "P2", however, is illustrated as having generated content "Cr4" having a strongly negative item affinity value 54c of "IAV(P2_Cr4)=–100", reflecting content that is strongly disliked by the user "P2". Assuming the user "P2" has a positive user affinity value 56a toward the content 162 of "UAV(C1_P2)=175", the resulting affinity correlation value for the content "Cr2" 190 is "AC2=–17,500".

In contrast, the most positive item affinity values 54a associated with a user having a negative user affinity value 56c (for example, Pn) near the bottom of the ordered list 189 causes the created content (for example, Cm) to be moved toward the bottom of the ordered list 192 based on the corresponding affinity correlation value (ACn). Also note that a negative item affinity values 54c toward created content 190 by a user having a negative user affinity value 56c can increase the corresponding affinity correlation value (AC), since the two negative values cancel each other out to create a larger positive value. In addition, neutral affinity values 54b provide little change in the ordering in created content (for example, Cr3) relative to a given user (for example, P3). Also note that the ordered list of created content 192 can be filtered by the processor circuit 22 to include only items that have some relevance to the content 162.

The processor circuit 22 evaluates in step 194 the respective gestures 196 by users 198 that have viewed or commented on the newly created content 190. In particular, the gestures 196 relative to the created content 190 can include positive gestures 196a, neutral gestures 196b, and negative gestures 196c, implemented for example as one or more view gestures, ratings gestures, recommendation gestures, etc. In this example, a positive gesture 196a is detected by the processor circuit 22 as reflecting a relatively strong influence of a corresponding network item (for example, "Cr2") 190 on a user (for example, "Pv2") 198, and can include additional creation gestures that strongly agree with a given created content 190, or that strongly disagree with a given created content, offering for example a contrarian view to the content 190. Consequently, the created content 190 can initiate active discussions between the users 198 resulting in generation of more created content 192. Example negative gestures 196c are detected by the processor circuit as reflecting a minimal influence on a user 198, and can include "ignore this content", "this content not relevant", or "this content is abusive or offensive". Hence, the users 198 can represent a community of online participants in an online discussion about the targeted product or service 162, for example a given episode of the television series or a movie.

The gestures 196 for a given created content 190 are accumulated by the processor circuit 22 relative to the corresponding created content 190 in order to identify an accumulated influence value (AV) of a given content 190 based on the gestures 196 generated by the users 198 viewing the created content 190. Hence, the accumulated influence value (AV) for a given created content item 190 represents the accumulation of the gestures 196 and identifies the cumulative influence of a given newly created content item 190 on the users 198. The processor circuit 22 reorders in step 200 the list of the created content according to the respective accumulated influence value (AV) into an ordered list of influential content 204, starting with the most influential content (for example, "Cr2") and ending with the least influential content (for example, "Crn").

The processor circuit reorders in step 202 the list of the users 189 into a list 206 of influential users based on determining respective user influence values (UV), for example based on to the respective accumulated influence values (AV) assigned to the content 190 created by the users in the ordered list 204. For example, the user influence value (UV) for a given user can be determined as an average of the accumulated influence values of the content 190 written by the user; as illustrated in FIG. 15, the influence value for the user "P1" (UV1), based on the average accumulated influence values "AV2" and "AV1", is less than the influence value for the user "P2" (UV2) based on the accumulated influence value ("AV4") for the content "Cr4" 190 written by the user "P2". It will be appreciated that the user influence value (UV) may be based on multiple content items 190 written by the corresponding user; further, calculation of the user influence value (UV) by the processor circuit 22 for a given user may be context-specific, where a user may have multiple user influence values (UV) depending on the context (for example, a sports user influence value, a political user influence value, a community-specific user influence value, etc.); in addition, the contribution of a given accumulated influence value (AV) toward the user influence value (UV) may be weighted, for example according to a decay function, etc.

Hence, the reordering of the list 189 in step 202 results in a reordered list that identifies the key influencers 160c (having created the most influential content 190) at the top of the reordered list, followed by the active participants 160b below the key influencers 160c, with the active participant having the most negative influence (for example, "Pn") at the bottom of the reordered list. As described previously, a lurker 160a is defined as a person that has a view gesture 164 but no creation gesture 166 (or an insufficient number to qualify as an active participant), hence lurkers 160a are absent from the list 206 of influential users because the lurkers 160a have no creation gestures. Hence, the relative position of the identified user 16 within the reordered list after step 202 determines whether the identified user is an active participant 160b, or a key influencer 160c. As apparent from the foregoing, the method in FIG. 15 also can be modified by creating in step 186 the ordered list 189 the class of active participants 160b as opposed to the class of lurkers 160a, based on identifying users that have both the view gesture 164 and the creation gesture 166. Also note that the user influence value (UV) of a key influencer may be independent of the context of the content 162, enabling the identification by the processor circuit 22 of a user that can be a key influencer in a new category based on his or her influence in an existing category (for example, an influential sports celebrity that becomes influential in politics).

According to the disclosed embodiments, socially collaborative filtering can be applied to dynamically implement advertisement campaigns within a network. In addition, the use of socially collaborative filtering enables the advertisement campaigns to adapt as different users express different interests according to their socially relevant gestures. Hence, more precise targeting of advertisement assets can be provided to users, with minimal intervention by advertisers. The example embodiment also can be applied to reporting of advertisement metrics to advertisers, enabling advertisers to identify the effectiveness of advertisement campaigns with respect to the different classifications 160 of users, improving more detailed classification for advertisement distribution and revenue generation.

In addition, classifying a user into a user affinity category, based on determining whether the user has expressed a view gesture toward a targeted product, enables precise selection of the most appropriate advertisement asset for the advertisement campaign. Hence, the classifying based on whether the user has demonstrated the view gesture toward the targeted product is distinct from targeted advertising techniques that rely on predictive targeting, behavioral models, or behavioral targeting that attempt to predict behavioral patterns or psychographic profiles as commercially offered by "Wunderloop" (at the website address "www.wunderloop.com/en"), Revenue Science (at the website address "www.revenuescience.com"), Takoda (at the website address "www.tacoda.com") or Fast AdMomentum (at the website address "www.fastsearch.com/13a.aspx?m=1028&amid=11545").

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

identifying, in a network, user selection preferences of an identified user having accessed the network, the identifying based on an accumulation of user selection inputs executed by the identified user, the user selection inputs accumulated relative to a context of input options presented to the user and identifying respective available network items, the accumulation relative to the context including an identification of the input options not having been selected by the identified user, the accumulation not including any rating values submitted by the identified user;

classifying, by an apparatus in the network, the identified user into one of multiple user affinity categories relative to an advertisement campaign for a targeted product, the classifying based on determining whether one of the user selection inputs represents a view gesture of the user having viewed the targeted product, the user affinity categories including a lurker category of users containing at least the view gesture, the lurker category of users ordered based on respective user affinity values toward the targeted product, the lurker category containing a plurality of subcategories of users based on establishing an ordered list of influential content related to the targeted product and generated by a portion of the users in the lurker category, the user affinity categories further including a second ordered list of identified network users distinct from the lurker category and lacking the view gesture, the second ordered list of identified network users ordered based on their respective correlation of shared interests with the lurker category of users; and the apparatus selecting an advertisement asset for delivery to the identified user based on the classifying of the identified user into the one user affinity category, the advertisement asset selected from among multiple advertisement assets associated with the respective user affinity categories for the advertisement campaign.

2. The method of claim 1, further comprising:

updating the user selection preferences of the identified user in response to detecting a user selection input expressing an identifiable gesture relative to the advertisement asset delivered to the identified user, and updating user affinity values associated with the advertisement asset, for determining subsequent selection of the advertisement asset for the one user affinity category.

3. The method of claim 1, wherein the classifying includes:
if none of the user selection inputs for the identified user demonstrates the view gesture, classifying the identified user based on determining preferred network items for users having the view gesture relative to the targeted product, and determining a correlation level between the user selection inputs by the identified user relative to the preferred network items, or
if at least one of the user selection inputs for the identified user demonstrates a view gesture, classifying the identified user based on whether one of the user selection inputs of the identified user represents a creation gesture relative to the targeted product.

4. The method of claim 3, wherein:
the plurality of subcategories of users in the lurker category of users includes an active participants category of users containing the view gesture and at least the creation gesture, the active participants category including a key influencers category identifying active participants having created content related to the targeted product, using the corresponding creation gesture, that generate substantially favorable gestures by other users having viewed the created content relative to other created content created by other active participants;
the second ordered list of identified network users including:
a missed opportunity category of users that do not have the view gesture relative to the targeted product, the missed opportunity category of users having a highest correlation of shared interests with the lurker category of users,
a potential customer category of users that do not have the view gesture relative to the targeted product, the potential customer category of users having a lower correlation of shared interests with the lurker category of users than the missed opportunity category of users, and
a not interested category of users that do not have the view gesture relative to the targeted product, the not interested category of users having a lowest correlation of shared interests with the lurker category of users relative to the missed opportunity category of users and the potential customer category of users.

5. The method of claim 4, wherein if none of the user selection inputs for the identified user demonstrates the view gesture, the classifying includes generating a first ordered list of the preferred network items having respective item affinity values generated for the lurker category of users, and generating the second ordered list of identified network users distinct from the lurker category of users and providing respective user affinity values for each of the preferred network items based on the respective user selection preferences, the identified user classified into one of the missed opportunity category, the potential customer category, or the not interested category, based on a relative position of the identified user within the second ordered list.

6. The method of claim 4, wherein if at least one of the user selection inputs for the identified user demonstrates a view gesture, the classifying includes:
generating a first ordered list of the lurker category of users having respective user affinity values for the targeted product;
generating a second ordered list of the created content having respective affinity correlation values relative to the targeted product based on evaluating the respective creation gestures that generated the created content;
evaluating gestures for viewing the created content by the other users having viewed the created content;
reordering the second ordered list into the ordered list of influential content based on evaluating the gestures for viewing the created content, according to an accumulated influence value determined for each created content based on the corresponding gestures for viewing the corresponding created content;
reordering the first ordered list of the lurker category of users according to the respective accumulated influence values, the reordered first ordered list ordering in sequence the key influencers category, the active participants category and the lurker category; and
classifying the identified user based on a relative position of the identified user within the reordered first ordered list.

7. The method of claim 6, wherein the identified user is classified within the key influencers category of users as contrarian user having expressed a substantial dislike of the targeted product and having an accumulated influence value indicating a substantial influence among the other users having viewed the created content, wherein the advertisement asset delivered to the identified user is directed for the contrarian user within the key influencers category of users.

8. The method of claim 3, further comprising the apparatus selecting the advertisement campaign for the targeted product, from among a plurality of advertisement campaigns for respective targeted products, based on:
determining a group of network users having a highest correlation of shared interests with the identified user, based on (1) identifying, from the available network items, second preferred network items having highest relative item affinity values generated for the identified user based on the user selection preferences, and (2) identifying first network users providing highest relative user affinity values for each of the preferred network items based on the respective user selection preferences;
generating a first ordered list of network items most likely to be preferred by the identified user based on determining, from among network items not presented to the identified user, the preferred network items for each of the first network users in the group based on the respective user selection preferences, the first ordered list of network items including the advertisement campaign for the targeted product and at least one of the plurality of advertisement campaigns;
filtering the first ordered list of network items with a second list of network items related to the context presented to the identified user, the second list of network items including the advertisement campaign for the targeted product and at least one of the plurality of advertisement campaigns; and
identifying the advertisement campaign for the targeted product as having a highest relative position within first ordered list filtered with the second list, relative to any of the plurality of advertisement campaigns.

9. The method of claim 1, further comprising creating the advertisement campaign for the targeted product based on adding the advertisement campaign for the targeted product as an available network item in the network, including artificially creating a substantially strong affinity value between the advertisement campaign and at least one of an ideal targeted user having an artificially created item affinity value toward at least one other network item, a prescribed demographic identifying users having respective item affinity values toward network items, or an existing network item.

10. The method of claim 9, wherein the creating the advertisement campaign includes storing a set of user-item relationships for the ideal targeted user that specifies a substantially strong affinity value between the advertisement campaign and the ideal targeted user, and the artificially created item affinity value toward the at least one other network item.

11. The method of claim 9, wherein the creating the advertisement campaign includes identifying the users within the prescribed demographic, and assigning to each of the users the substantially strong affinity value toward the advertisement campaign as a corresponding input to the corresponding user selection preferences.

12. The method of claim 9, wherein the creating the advertisement campaign includes creating the substantially strong affinity value between the advertisement campaign and the existing network item based on creating a similarity relationship between the existing network item and the advertisement campaign, causing user affinity values associated with user selection preferences of respective users to be replicated toward the advertisement campaign.

13. An apparatus comprising:
a network interface circuit configured for determining an identified user is accessing a network, and in response outputting, via the network for presentation to the identified user, an advertisement asset for delivery to the identified user; and
a processor circuit configured for: identifying user selection preferences of the identified user based on an accumulation of user selection inputs executed by the identified user, the user selection inputs accumulated relative to a context of input options presented to the user and identifying respective available network items, the accumulation relative to the context including an identification of the input options not having been selected by the identified user, the accumulation not including any rating values submitted by the identified user,
classifying the identified user into one of multiple user affinity categories relative to an advertisement campaign for a targeted product, the classifying based on the processor circuit determining whether one of the user selection inputs represents a view gesture of the user having viewed the targeted product, the user affinity categories including a lurker category of users containing at least the view gesture, the lurker category of users ordered based on respective user affinity values toward the targeted product, the lurker category containing a plurality of subcategories of users based on establishing an ordered list of influential content related to the targeted product and generated by a portion of the users in the lurker category, the user affinity categories further including a second ordered list of identified network users distinct from the lurker category and lacking the view gesture, the second ordered list of identified network users ordered based on their respective correlation of shared interests with the lurker category of users, and
selecting the advertisement asset for delivery to the identified user based on the classifying of the identified user into the one user affinity category, the advertisement asset selected from among multiple advertisement assets associated with the respective user affinity categories for the advertisement campaign.

14. The apparatus of claim 13, wherein the processor circuit further is configured for:
updating the user selection preferences of the identified user in response to detecting a user selection input expressing an identifiable gesture relative to the advertisement asset delivered to the identified user, and
updating user affinity values associated with the advertisement asset, for determining subsequent selection of the advertisement asset for the one user affinity category.

15. The apparatus of claim 13, wherein the processor circuit is configured for classifying the identified user based on:
if none of the user selection inputs for the identified user demonstrates the view gesture, classifying the identified user based on determining preferred network items for users having the view gesture relative to the targeted product, and determining a correlation level between the user selection inputs by the identified user relative to the preferred network items, or
if at least one of the user selection inputs for the identified user demonstrates a view gesture, classifying the identified user based on whether one of the user selection inputs of the identified user represents a creation gesture relative to the targeted product.

16. The apparatus of claim 15, wherein:
the plurality of subcategories of users in the lurker category of users includes an active participants category of users containing the view gesture and at least the creation gesture, the active participants category including a key influencers category identifying active participants having created content related to the targeted product, using the corresponding creation gesture, that generate substantially favorable gestures by other users having viewed the created content relative to other created content created by other active participants;
the second ordered list of identified network users including:
a missed opportunity category of users that do not have the view gesture relative to the targeted product, the missed opportunity category of users having a highest correlation of shared interests with the lurker category of users,
a potential customer category of users that do not have the view gesture relative to the targeted product, the potential customer category of users having a lower correlation of shared interests with the lurker category of users than the missed opportunity category of users, and
a not interested category of users that do not have the view gesture relative to the targeted product, the not interested category of users having a lowest correlation of shared interests with the lurker category of users relative to the missed opportunity category of users and the potential customer category of users.

17. The apparatus of claim 16, wherein the processor circuit is configured such that if none of the user selection inputs for the identified user demonstrates the view gesture, the processor circuit executes the classifying based on generating a first ordered list of the preferred network items having respective item affinity values generated for the lurker category of users, and generating the second ordered list of identified network users distinct from the lurker category of users and providing respective user affinity values for each of the preferred network items based on the respective user selection preferences, the identified user classified by the processor circuit into one of the missed opportunity category, the potential customer category, or the not interested category, based on a relative position of the identified user within the second ordered list.

18. The apparatus of claim 16, wherein the processor circuit is configured such that if at least one of the user selection inputs for the identified user demonstrates a view gesture, the processor circuit executes the classifying based on:

generating a first ordered list of the lurker category of users having respective user affinity values for the targeted product;

generating a second ordered list of the created content having respective affinity correlation values relative to the targeted product based on evaluating the respective creation gestures that generated the created content;

evaluating gestures for viewing the created content by the other users having viewed the created content;

reordering the second ordered list into the ordered list of influential content based on evaluating the gestures for viewing the created content, according to an accumulated influence value determined for each created content based on the corresponding gestures for viewing the corresponding created content;

reordering the first ordered list of the lurker category of users according to the respective accumulated influence values, the reordered first ordered list ordering in sequence the key influencers category, the active participants category and the lurker category; and classifying the identified user based on a relative position of the identified user within the reordered first ordered list.

19. The apparatus of claim 18, wherein the identified user is classified by the processor circuit within the key influencers category of users as contrarian user having expressed a substantial dislike of the targeted product and having an accumulated influence value indicating a substantial influence among the other users having viewed the created content, wherein the advertisement asset delivered to the identified user is directed for the contrarian user within the key influencers category of users.

20. The apparatus of claim 15, wherein the processor circuit is configured for selecting the advertisement campaign for the targeted product, from among a plurality of advertisement campaigns for respective targeted products, based on:

determining a group of network users having a highest correlation of shared interests with the identified user, based on (1) identifying, from the available network items, second preferred network items having highest relative item affinity values generated for the identified user based on the user selection preferences, and (2) identifying first network users providing highest relative user affinity values for each of the preferred network items based on the respective user selection preferences;

generating a first ordered list of network items most likely to be preferred by the identified user based on determining, from among network items not presented to the identified user, the preferred network items for each of the first network users in the group based on the respective user selection preferences, the first ordered list of network items including the advertisement campaign for the targeted product and at least one of the plurality of advertisement campaigns;

filtering the first ordered list of network items with a second list of network items related to the context presented to the identified user, the second list of network items including the advertisement campaign for the targeted product and at least one of the plurality of advertisement campaigns; and identifying the advertisement campaign for the targeted product as having a highest relative position within first ordered list filtered with the second list, relative to any of the plurality of advertisement campaigns.

21. The apparatus of claim 13, wherein the processor circuit is configured for creating the advertisement campaign for the targeted product based on adding the advertisement campaign for the targeted product as an available network item in the network, including the processor circuit artificially creating a substantially strong affinity value between the advertisement campaign and at least one of an ideal targeted user having an artificially created item affinity value toward at least one other network item, a prescribed demographic identifying users having respective item affinity values toward network items, or an existing network item.

22. The apparatus of claim 21, wherein the processor circuit is configured for creating the advertisement campaign based on storing a set of user-item relationships for the ideal targeted user that specifies a substantially strong affinity value between the advertisement campaign and the ideal targeted user, and the artificially created item affinity value toward the at least one other network item.

23. The apparatus of claim 21, wherein the processor circuit is configured for creating the advertisement campaign based on identifying the users within the prescribed demographic, and assigning to each of the users the substantially strong affinity value toward the advertisement campaign as a corresponding input to the corresponding user selection preferences.

24. The apparatus of claim 23, wherein the processor circuit is configured for creating the advertisement campaign based on creating the substantially strong affinity value between the advertisement campaign and the existing network item based on creating a similarity relationship between the existing network item and the advertisement campaign, causing user affinity values associated with user selection preferences of respective users to be replicated toward the advertisement campaign.

25. An apparatus comprising: a network interface circuit configured for determining an identified user is accessing a network, and in response outputting, via the network for presentation to the identified user, an advertisement asset for delivery to the identified user, the accumulation not including any rating values submitted by the identified user; and means for selecting the advertisement asset based on:

identifying user selection preferences of the identified user based on an accumulation of user selection inputs executed by the identified user, the user selection inputs accumulated relative to a context of input options presented to the user and identifying respective available network items, the accumulation relative to the context including an identification of the input options not having been selected by the identified user, classifying the identified user into one of multiple user affinity categories relative to an advertisement campaign for a targeted product, the classifying based on determining whether one of the user selection inputs represents a view gesture of the user having viewed the targeted product, the user affinity categories including a lurker category of users containing at least the view gesture, the lurker category of users ordered based on respective user affinity values toward the targeted product, the lurker category containing a plurality of subcategories of users based on establishing an ordered list of influential content related to the targeted product and generated by a portion of the users in the lurker category, the user affinity categories further including a second ordered list of identified network users distinct from the lurker category and lacking the view gesture, the second ordered list of identified network users ordered based on their respective correlation of shared interests with the lurker category of users, and selecting the advertisement asset for delivery to the identified user based on the classifying of the identified user into the one user affinity category, the advertisement asset selected from among multiple advertisement assets associated with the respective user affinity categories for the advertisement campaign.

26. Logic encoded in one or more non-transitory tangible media for execution by a device and when executed operable for:

identifying user selection preferences of an identified user having accessed the network, the identifying based on an accumulation of user selection inputs executed by the identified user, the user selection inputs accumulated relative to a context of input options presented to the user and identifying respective available network items, the accumulation relative to the context including an identification of the input options not having been selected by the identified user, the accumulation not including any rating values submitted by the identified user;

classifying the identified user into one of multiple user affinity categories relative to an advertisement campaign for a targeted product, the classifying based on determining whether one of the user selection inputs represents a view gesture of the user having viewed the targeted product, the user affinity categories including a lurker category of users containing at least the view gesture, the lurker category of users ordered based on respective user affinity values toward the targeted product, the lurker category containing a plurality of subcategories of users based on establishing an ordered list of influential content related to the targeted product and generated by a portion of the users in the lurker category, the user affinity categories further including a second ordered list of identified network users distinct from the lurker category and lacking the view gesture, the second ordered list of identified network users ordered based on their respective correlation of shared interests with the lurker category of users; and selecting an advertisement asset for delivery to the identified user based on the classifying of the identified user into the one user affinity category, the advertisement asset selected from among multiple advertisement assets associated with the respective user affinity categories for the advertisement campaign.

* * * * *